United States Patent
Park et al.

(10) Patent No.: US 10,289,230 B2
(45) Date of Patent: May 14, 2019

(54) GRAPHENE TOUCH SENSOR, METHOD FOR OPERATING SAME, AND METHOD FOR MANUFACTURING SAME

(71) Applicant: IUCF-HYU (Industry-University Cooperation Foundation Hanyang University), Seoul (KR)

(72) Inventors: Wanjun Park, Seoul (KR); Sungwoo Chun, Gimpo-si (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 213 days.

(21) Appl. No.: 15/312,354

(22) PCT Filed: May 11, 2015

(86) PCT No.: PCT/KR2015/004666
§ 371 (c)(1),
(2) Date: Nov. 18, 2016

(87) PCT Pub. No.: WO2015/178607
PCT Pub. Date: Nov. 26, 2015

(65) Prior Publication Data
US 2017/0090639 A1 Mar. 30, 2017

(30) Foreign Application Priority Data

May 20, 2014 (KR) .................. 10-2014-0060134
May 20, 2014 (KR) .................. 10-2014-0060139
May 20, 2014 (KR) .................. 10-2014-0060148

(51) Int. Cl.
*G06F 3/041* (2006.01)
*B32B 18/00* (2006.01)
(Continued)

(52) U.S. Cl.
CPC ............ *G06F 3/0414* (2013.01); *B32B 18/00* (2013.01); *G06F 3/041* (2013.01); *G06F 3/044* (2013.01);
(Continued)

(58) Field of Classification Search
CPC ........ G06F 3/0414; G06F 3/041; G06F 3/044; G06F 3/045; G06F 2203/04102;
(Continued)

(56) References Cited

U.S. PATENT DOCUMENTS 9,046,973 B2 6/2015 Powers
2012/0319976 A1 12/2012 Ahn et al.
(Continued)

FOREIGN PATENT DOCUMENTS

KR 1020110049593 5/2011
KR 1020110090135 8/2011
(Continued)

*Primary Examiner* — Dmitriy Bolotin
(74) *Attorney, Agent, or Firm* — Finch & Maloney PLLC

(57) ABSTRACT

A graphene touch sensor is provided. The graphene touch sensor includes a first substrate, a first pattern disposed on the first substrate and having a first protruding region and a first concave region, a second substrate on the first substrate, a second pattern disposed on the second substrate to face the first pattern and having a second protruding region and a second concave region, and a graphene layer between the first pattern and the second pattern.

19 Claims, 24 Drawing Sheets

(51) Int. Cl.
*G06F 3/044* (2006.01)
*G06F 3/045* (2006.01)

(52) U.S. Cl.
CPC ........ *G06F 3/045* (2013.01); *B32B 2307/206* (2013.01); *B32B 2457/00* (2013.01); *G06F 2203/04102* (2013.01); *G06F 2203/04103* (2013.01); *G06F 2203/04105* (2013.01); *G06F 2203/04112* (2013.01)

(58) Field of Classification Search
CPC . G06F 2203/04103; G06F 2203/04105; G06F 2203/04112; B32B 18/00; B32B 2457/00
See application file for complete search history.

(56) References Cited

U.S. PATENT DOCUMENTS

| | | | | |
|---|---|---|---|---|
| 2013/0285970 | A1* | 10/2013 | Ahn | G06F 3/044 345/173 |
| 2014/0055407 | A1 | 2/2014 | Lee et al. | |
| 2015/0130746 | A1* | 5/2015 | Jung | B32B 37/025 345/174 |
| 2015/0185911 | A1* | 7/2015 | Kim | G06F 3/044 349/12 |
| 2015/0241908 | A1* | 8/2015 | Ozyilmaz | H01L 41/193 345/174 |
| 2016/0026284 | A1* | 1/2016 | Wang | G06F 3/044 345/174 |
| 2016/0026292 | A1* | 1/2016 | Wang | G06F 3/044 345/174 |
| 2016/0287089 | A1* | 10/2016 | Yi | A61B 5/6897 |
| 2016/0313194 | A1* | 10/2016 | Scheffer | G01L 1/142 |
| 2018/0143715 | A1* | 5/2018 | Song | G06F 3/0412 |

FOREIGN PATENT DOCUMENTS

| | | |
|---|---|---|
| KR | 1020120045581 | 5/2012 |
| KR | 1020120053294 | 5/2012 |
| KR | 1020120073140 | 7/2012 |
| KR | 1020120111607 | 10/2012 |
| KR | 1020130081988 | 7/2013 |
| KR | 1020130091493 | 8/2013 |
| KR | 1020130112228 | 10/2013 |
| KR | 1020130124822 | 11/2013 |
| KR | 1020140012601 | 2/2014 |

* cited by examiner

[Fig. 1]
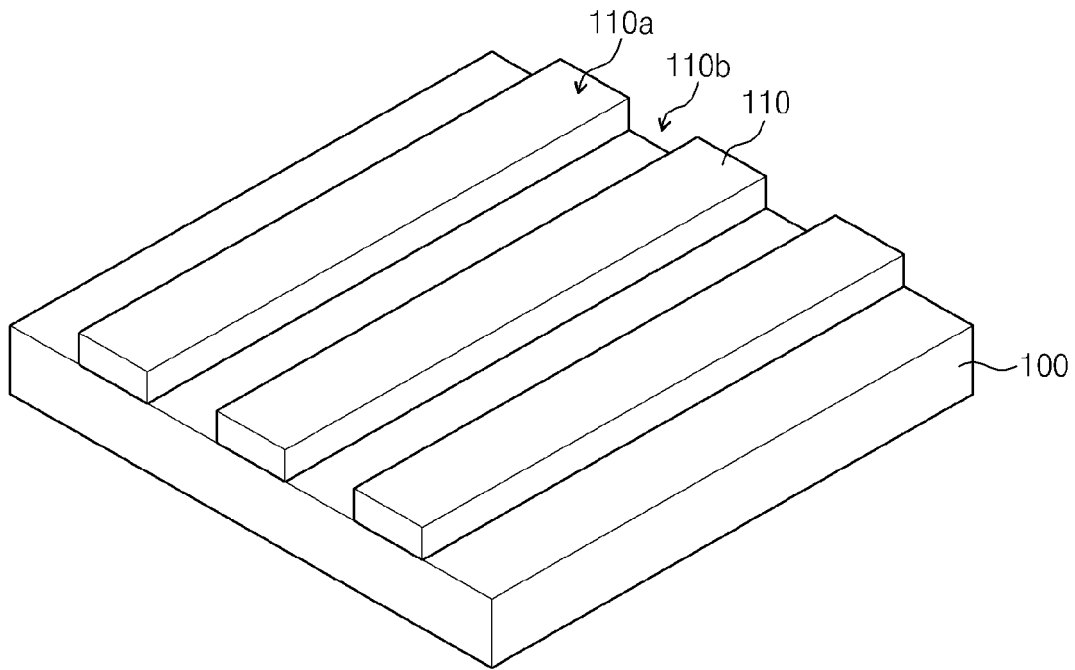
[Fig. 2]
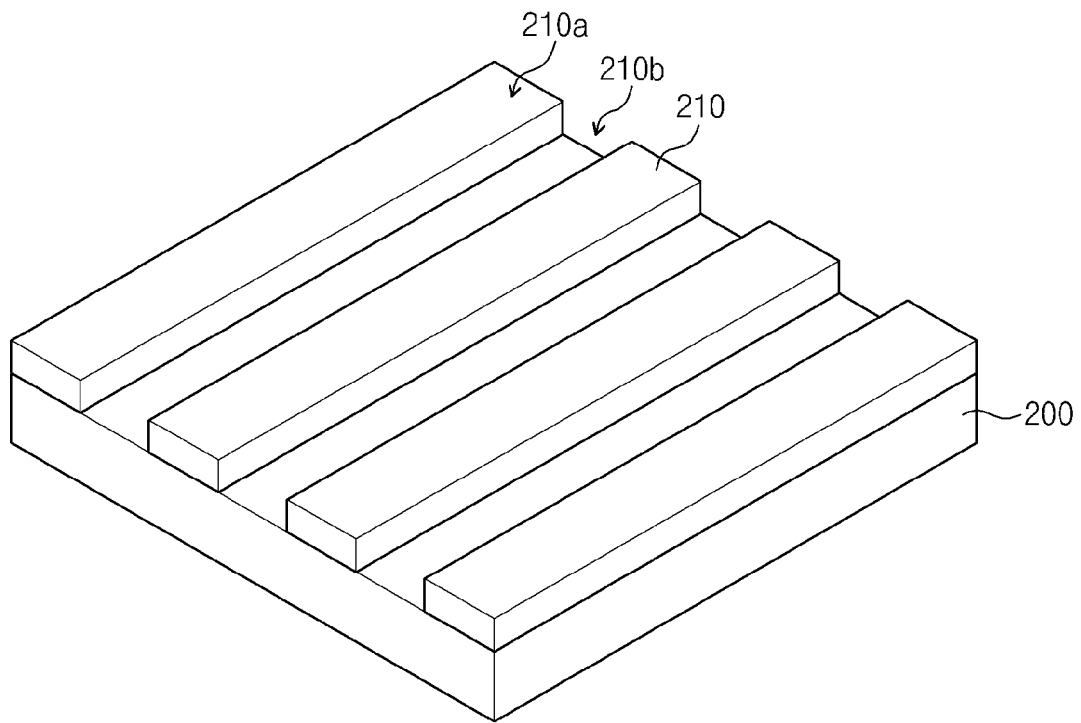

[Fig. 3]
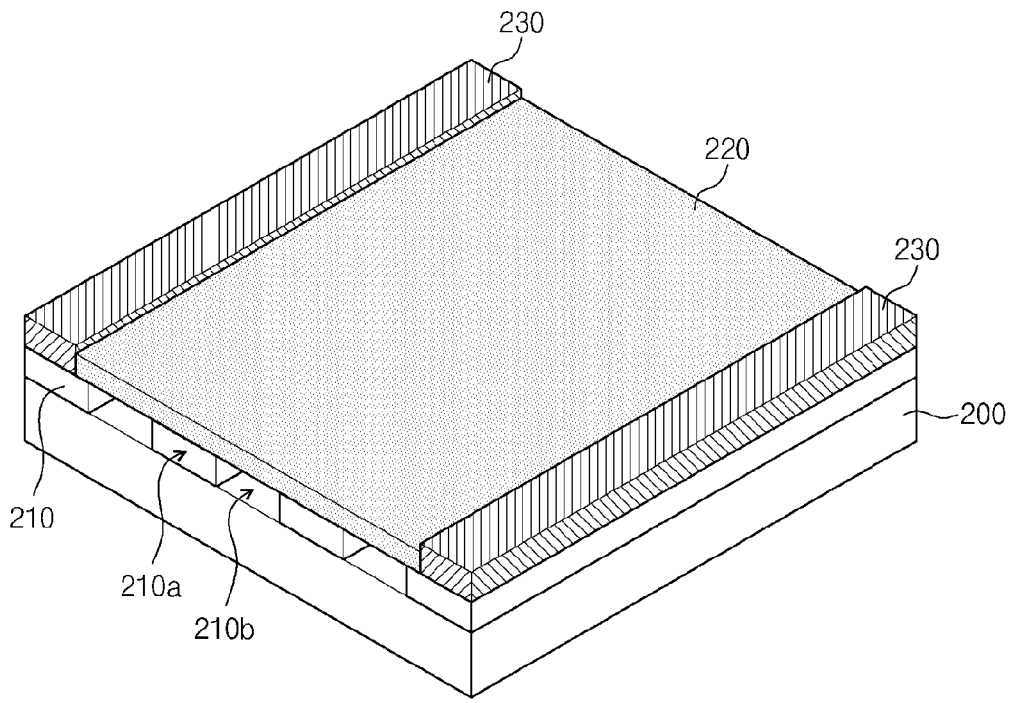
[Fig. 4]
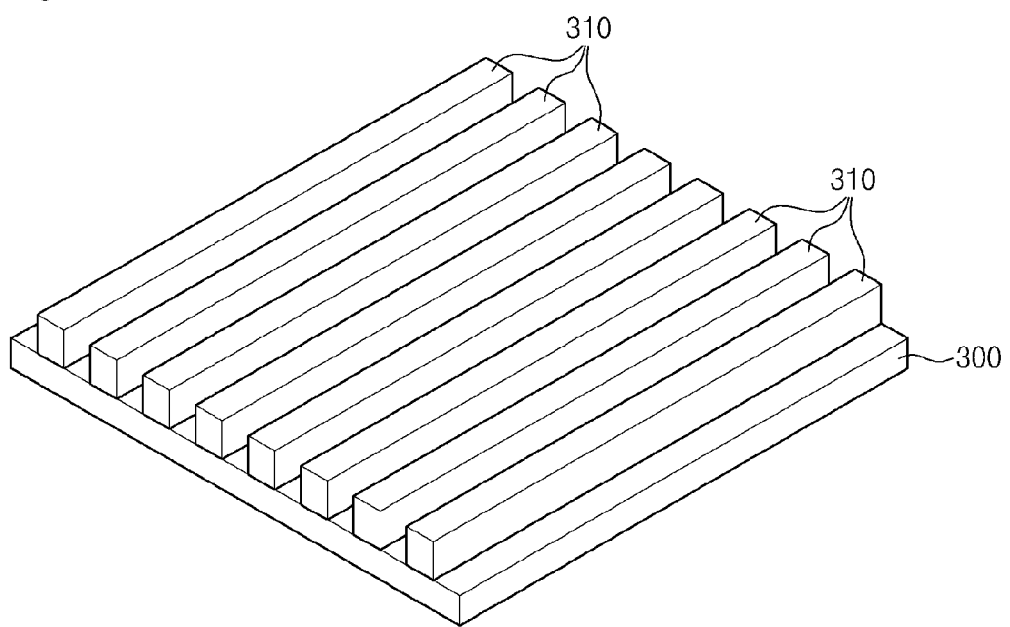

[Fig. 5]
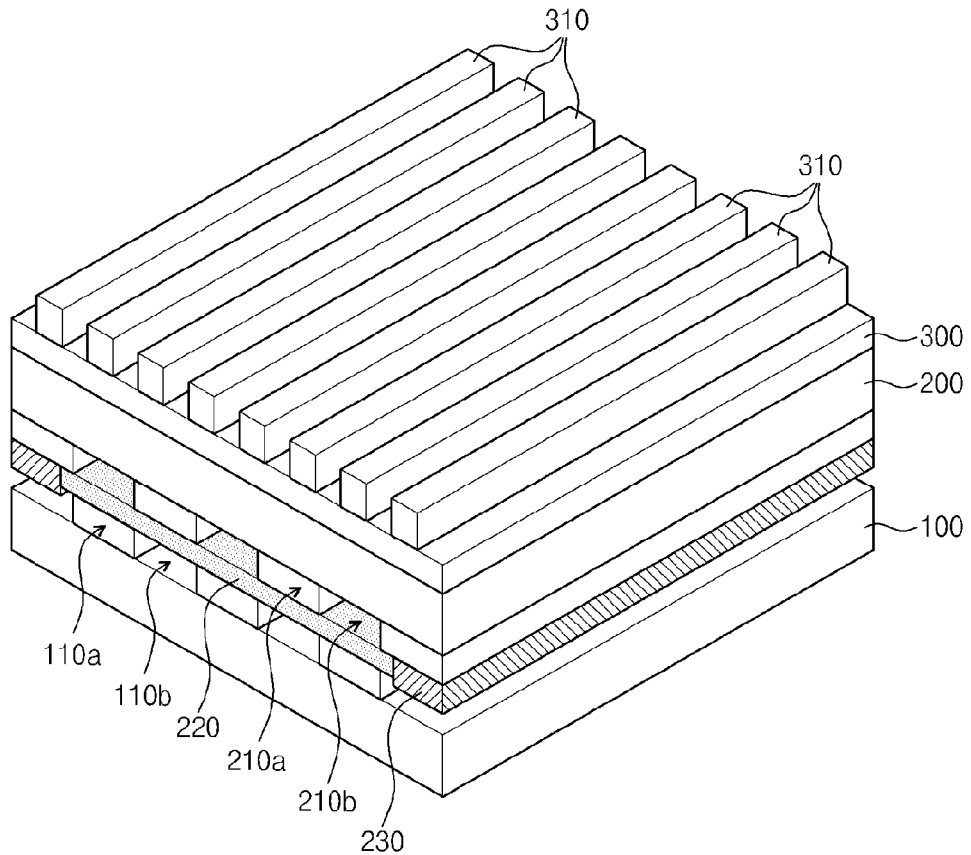
[Fig. 6]
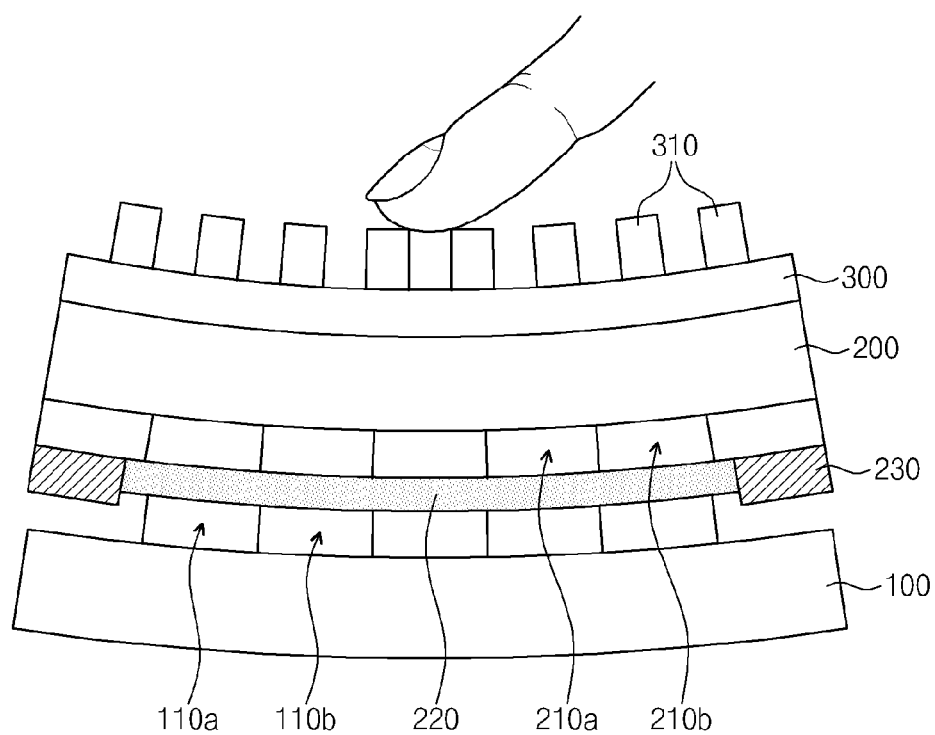

[Fig. 7]
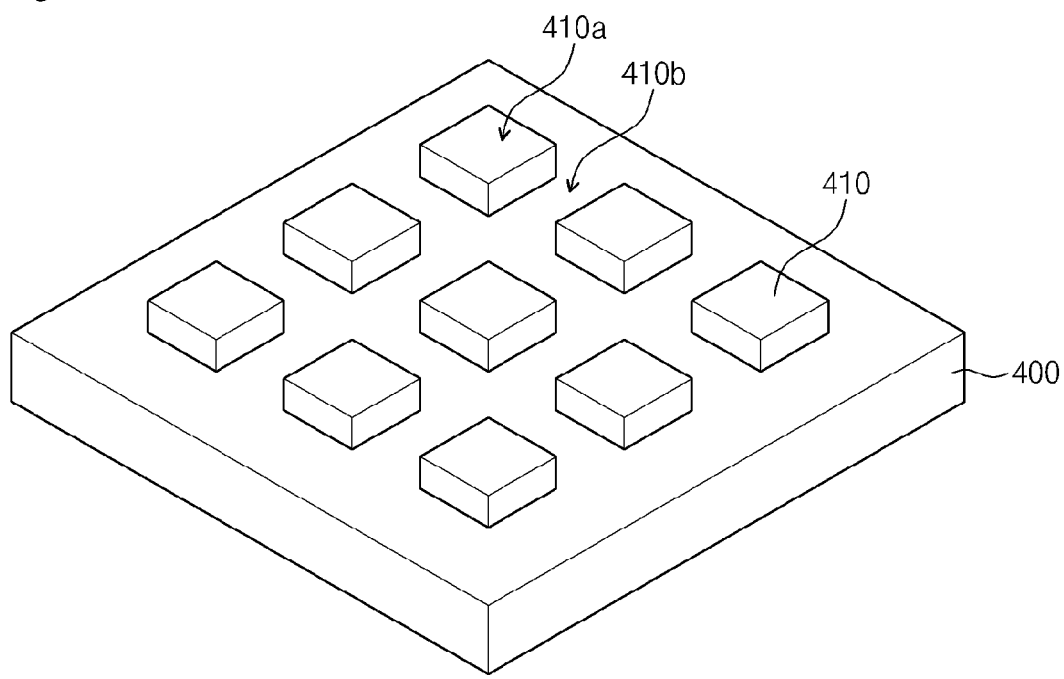
[Fig. 8]
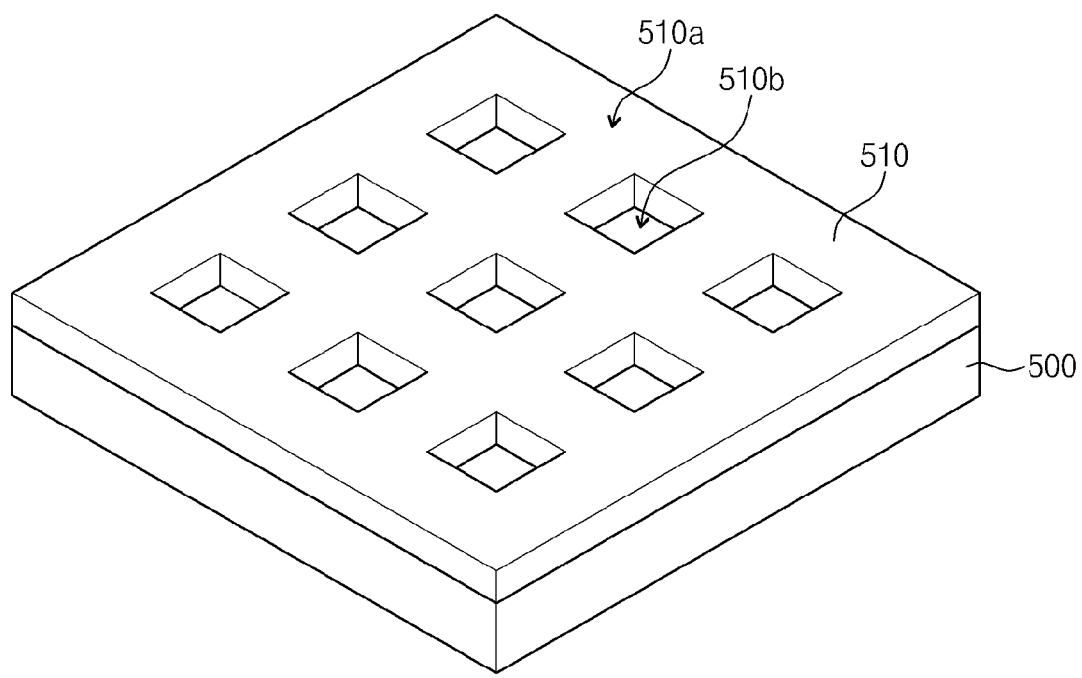

[Fig. 9]
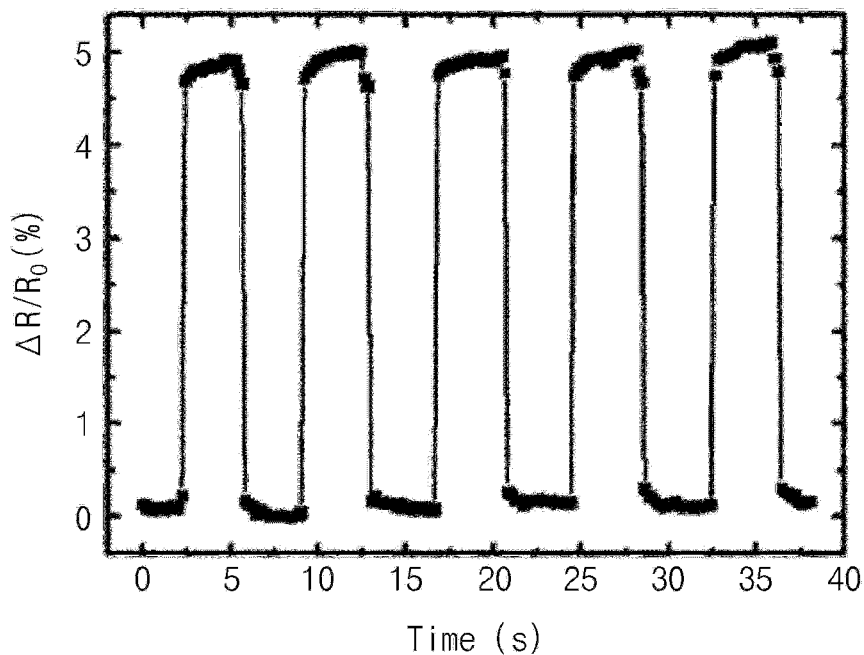
[Fig. 10]
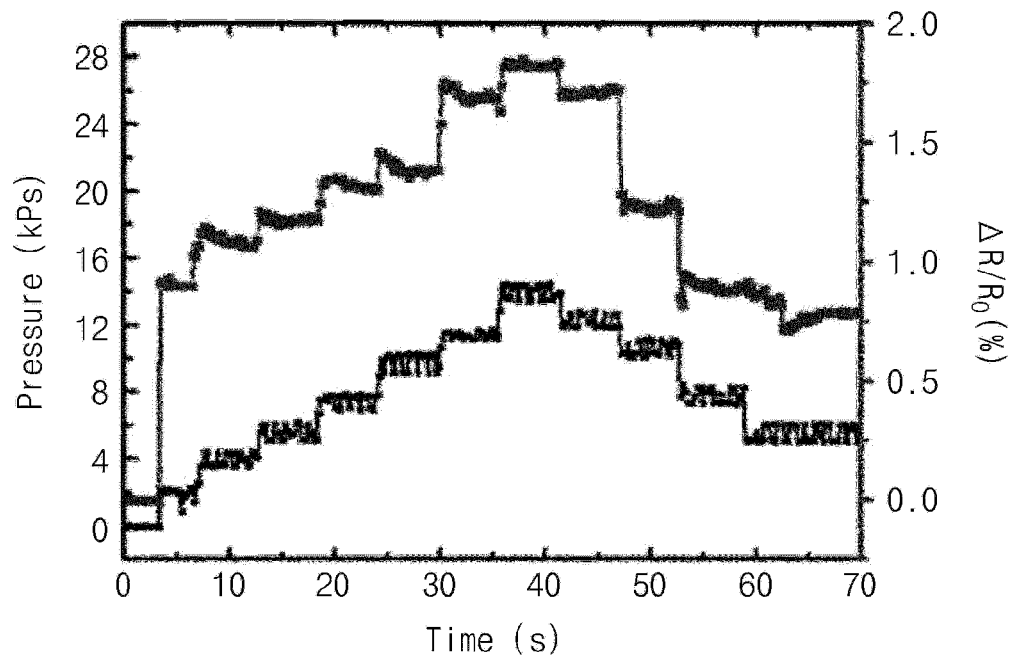

[Fig. 11]
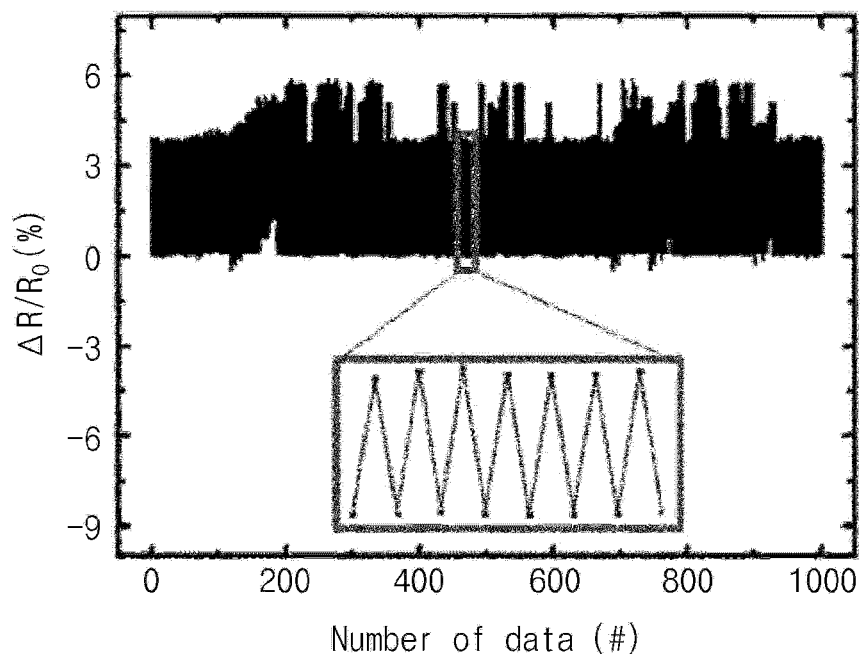
[Fig. 12]
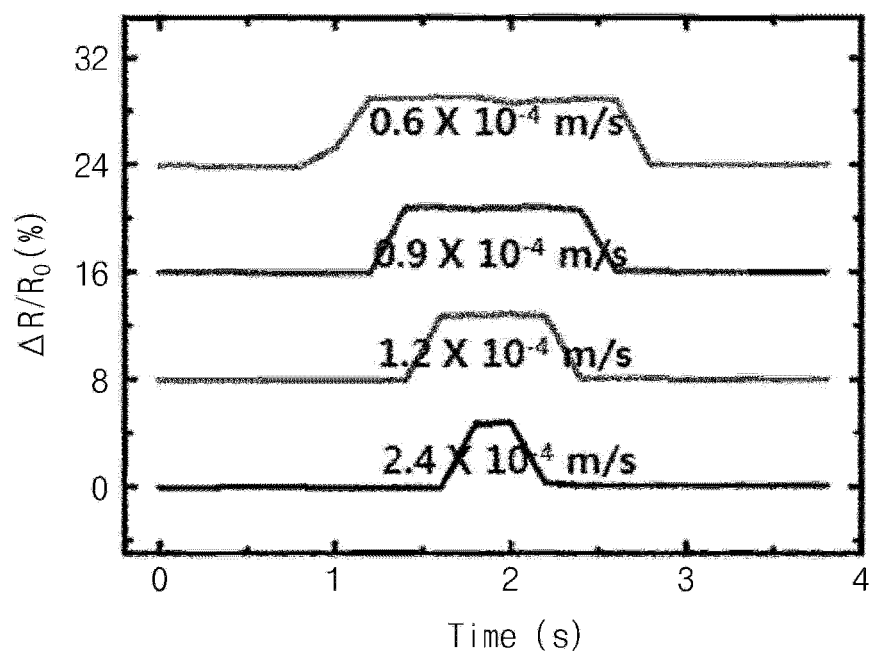

[Fig. 13]
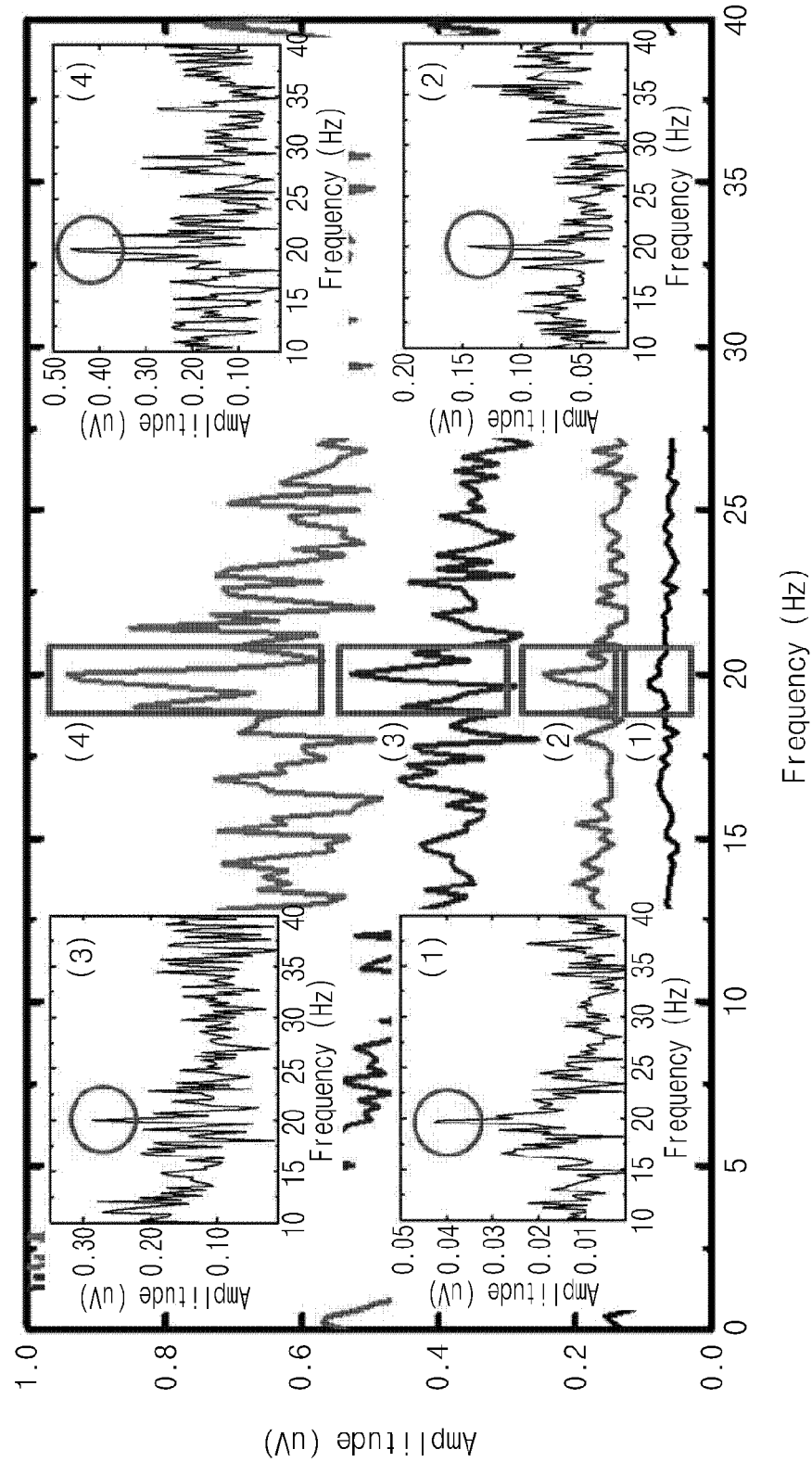

[Fig. 14]
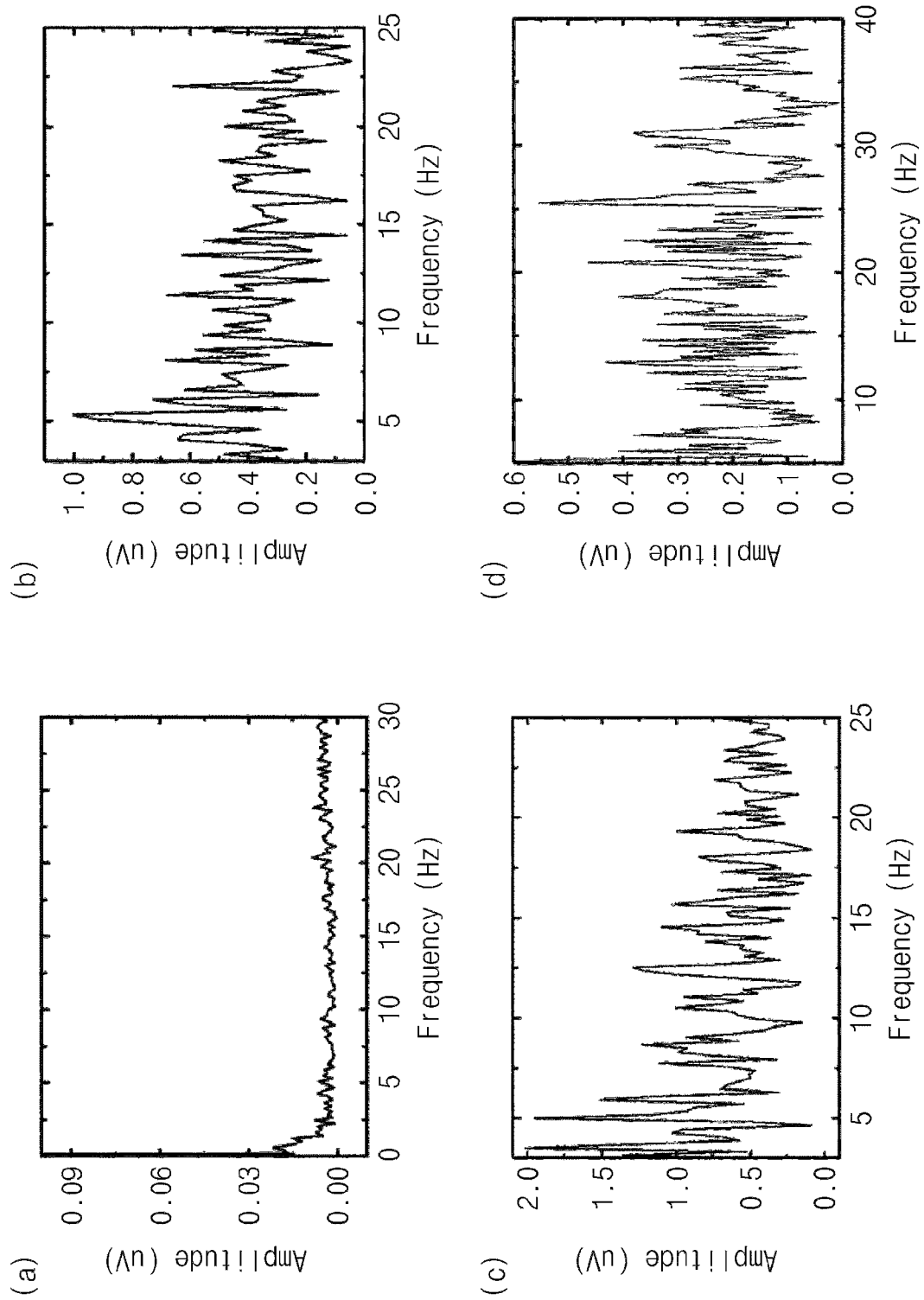

[Fig. 15]
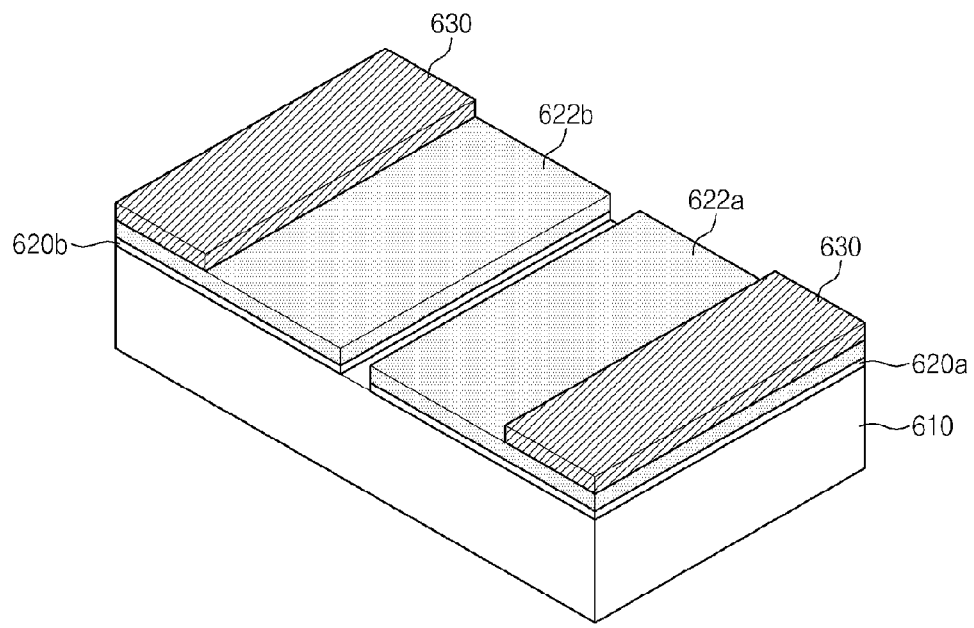
[Fig. 16]
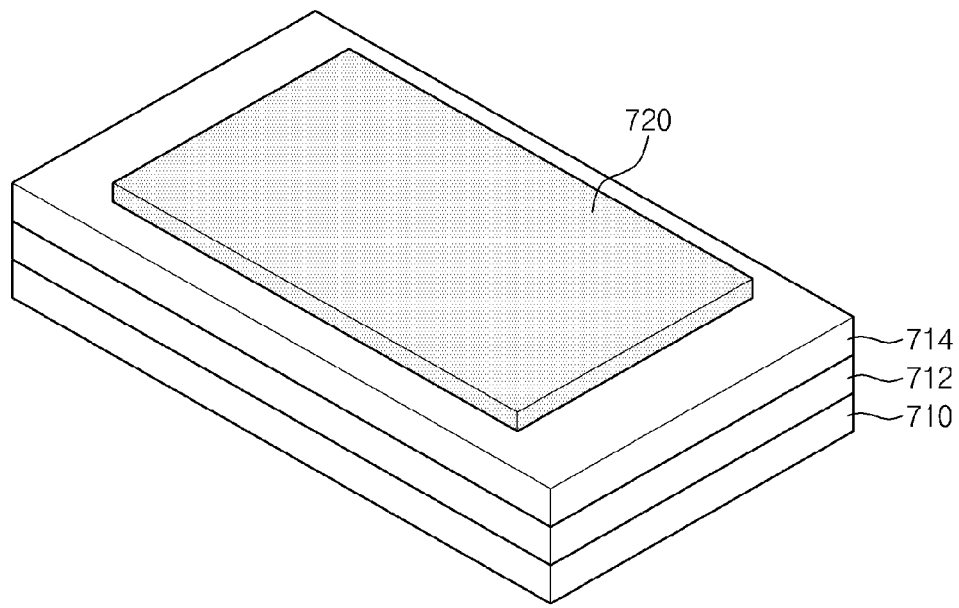

[Fig. 17]
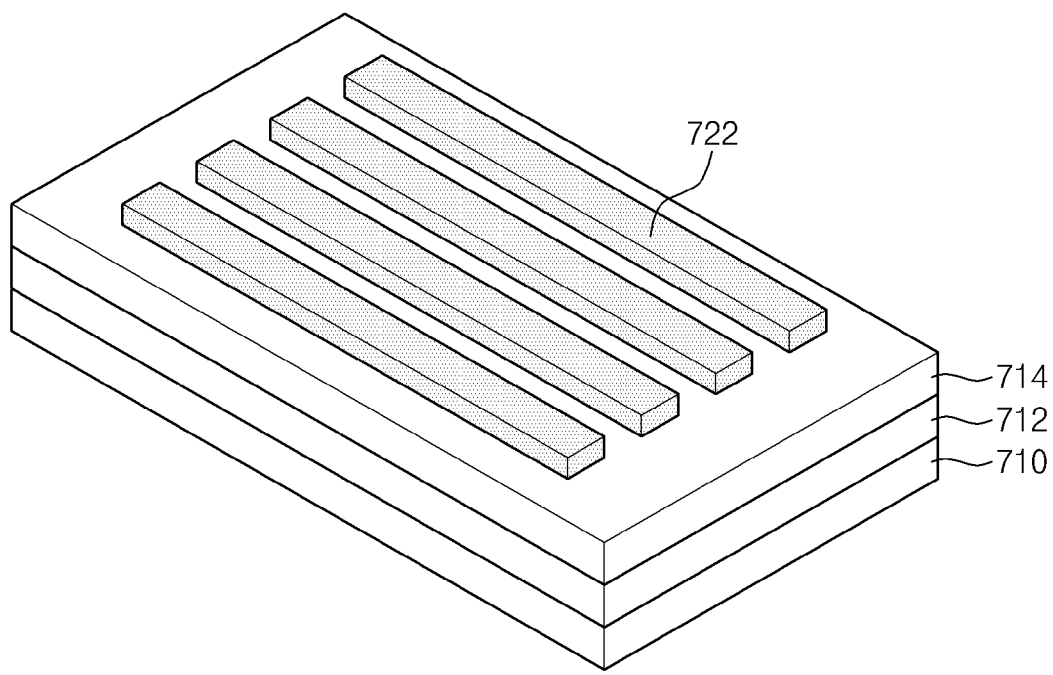

[Fig. 18]
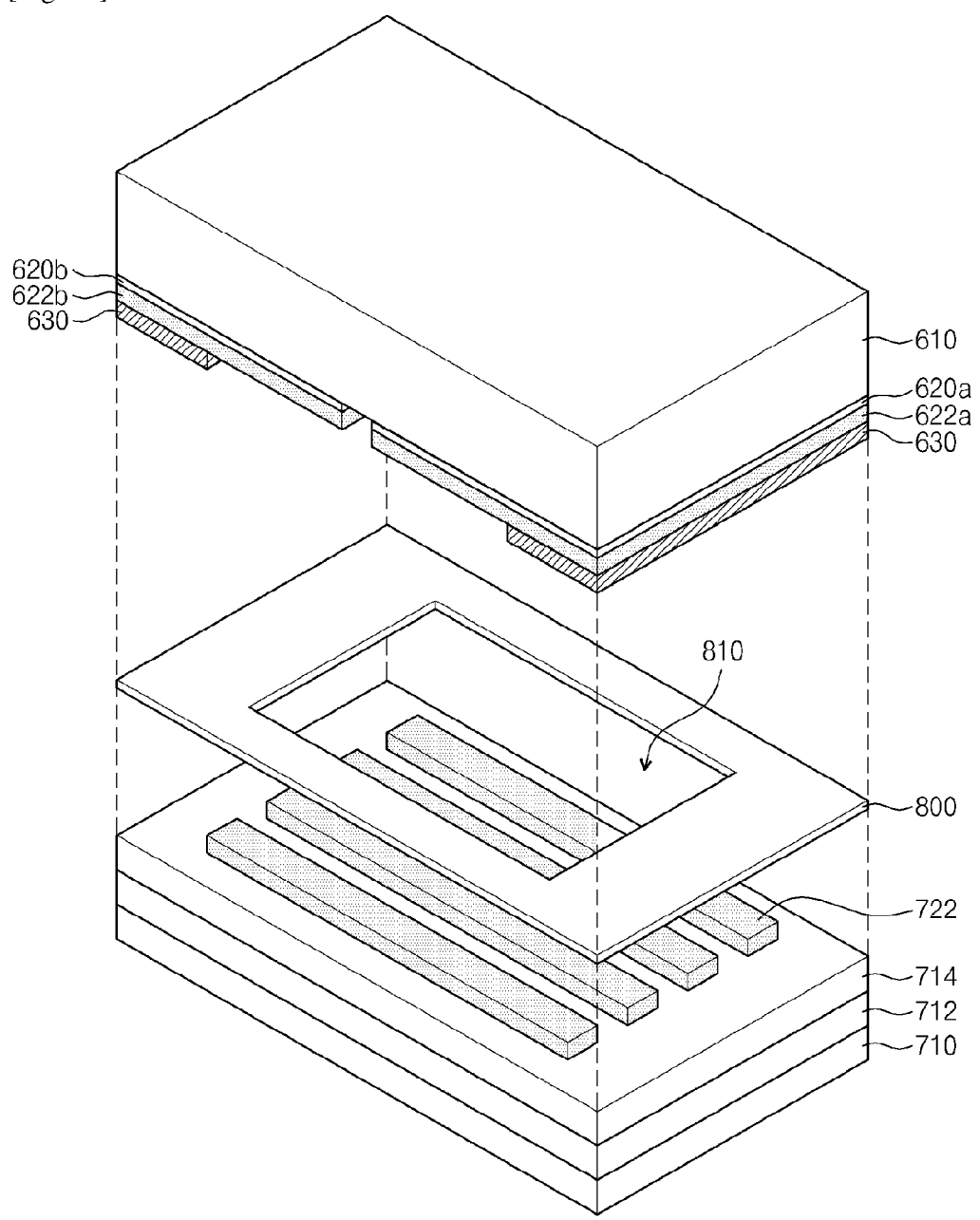

[Fig. 19]
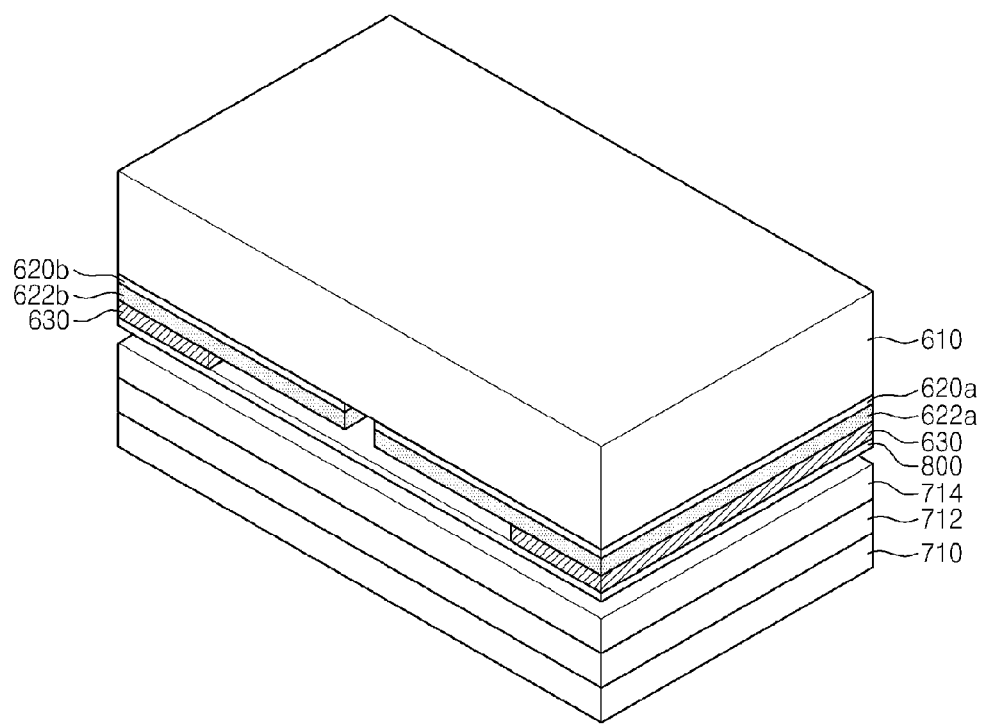
[Fig. 20]
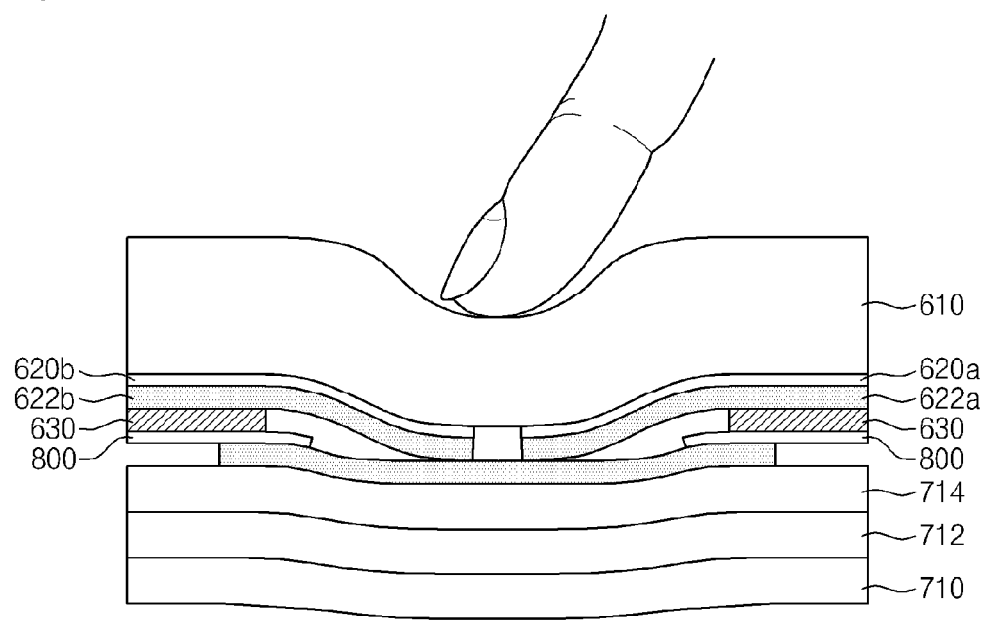

[Fig. 21]
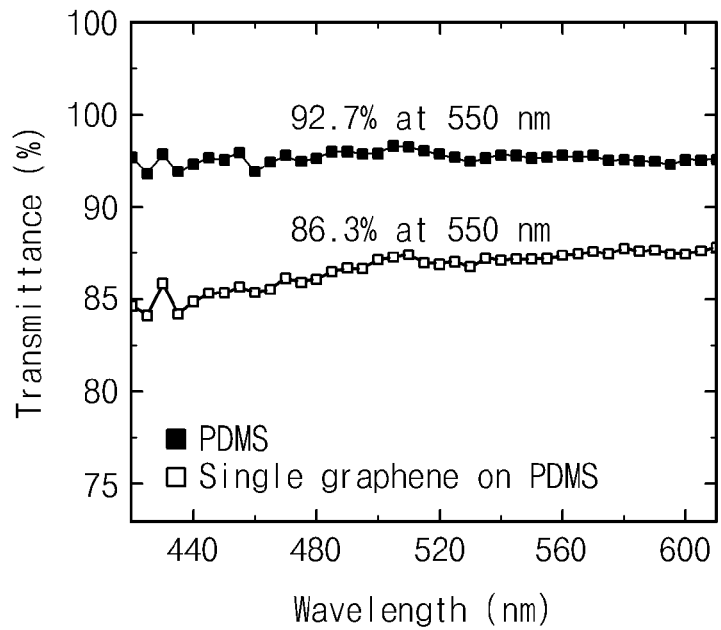
(a)
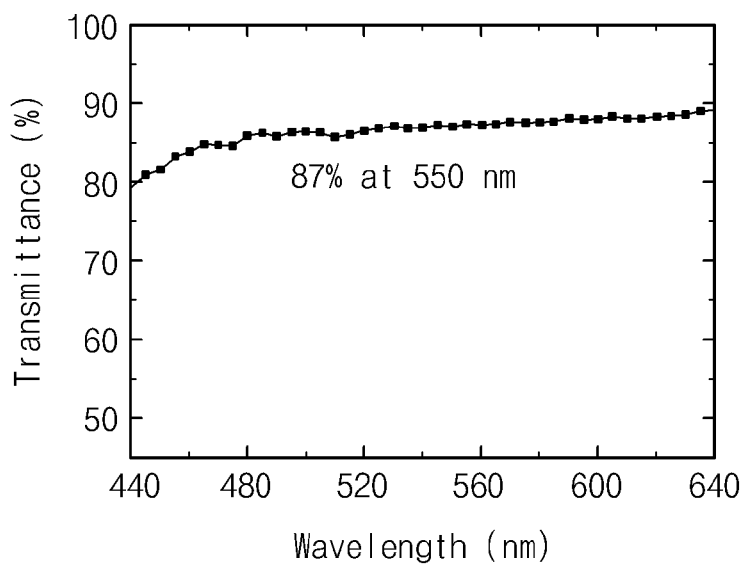
(b)

[Fig. 22]
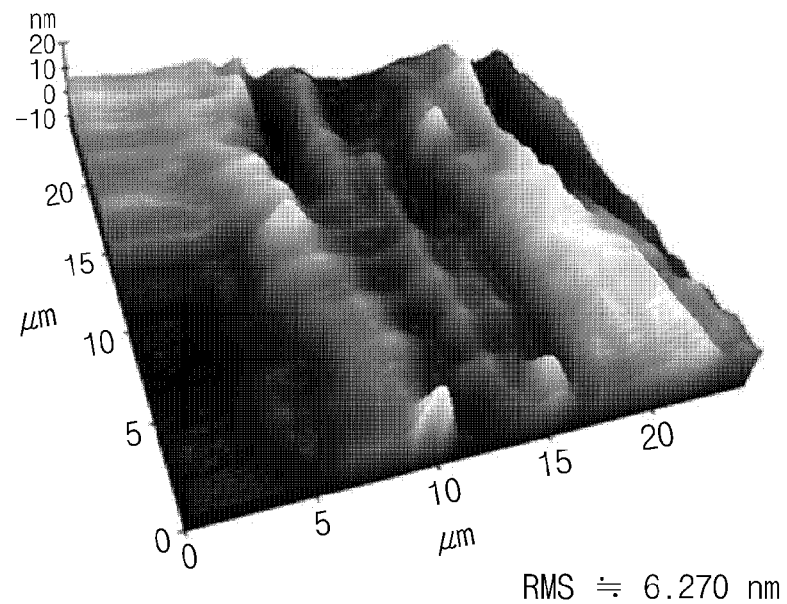
RMS ≒ 6.270 nm
(a)
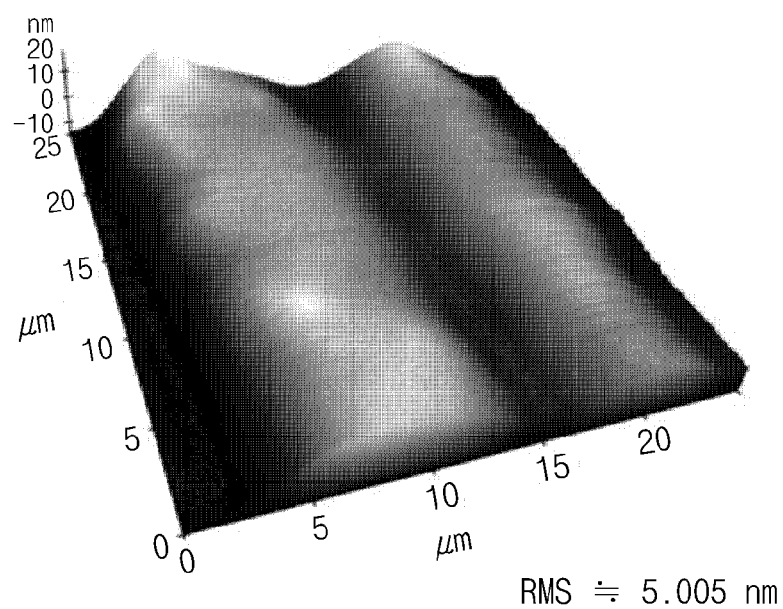
RMS ≒ 5.005 nm
(b)

[Fig. 23]
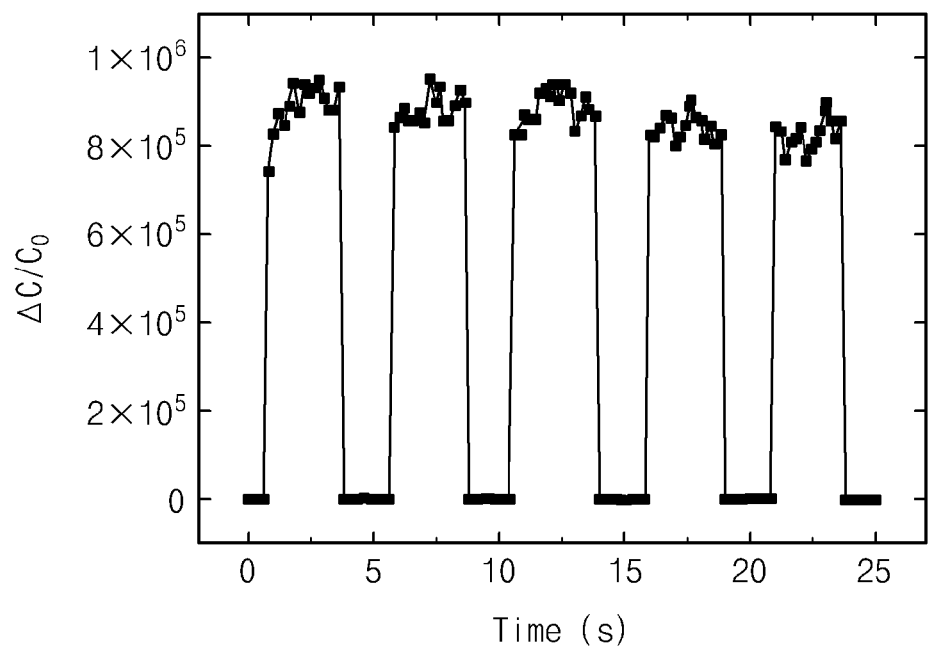
[Fig. 24]
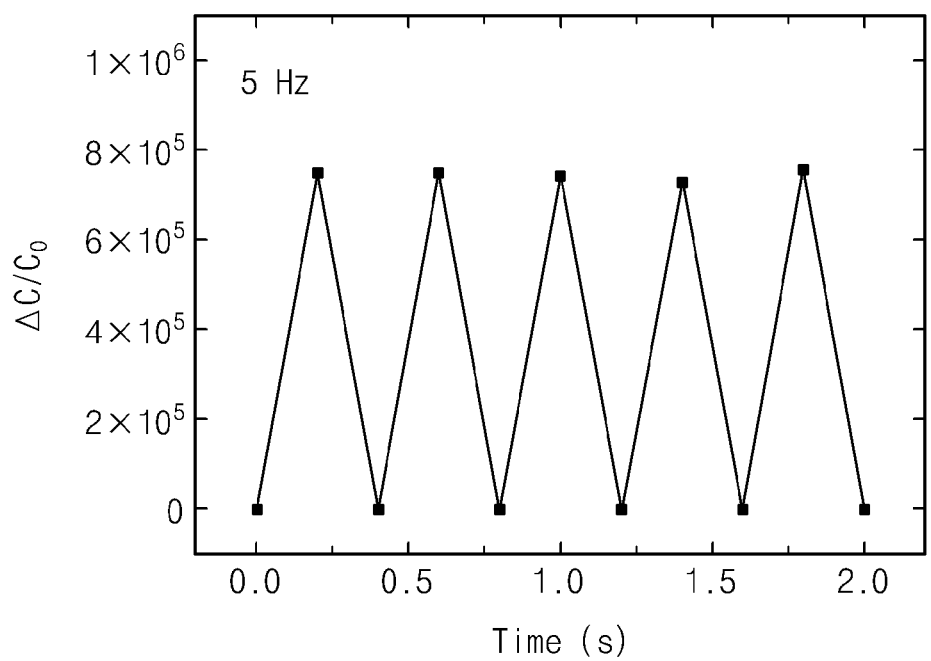

[Fig. 25]
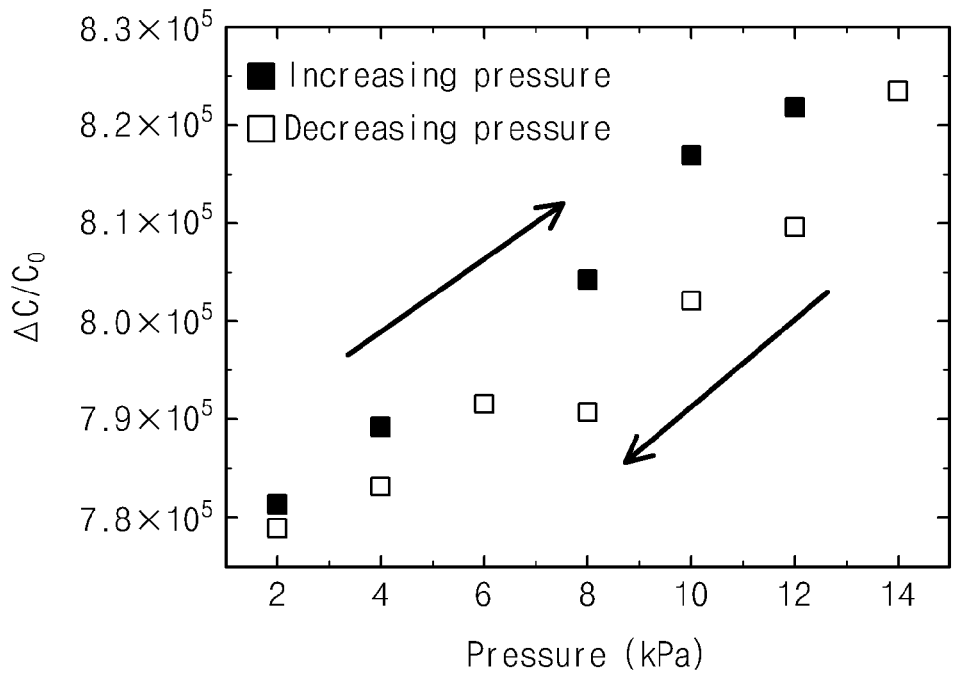
[Fig. 26]
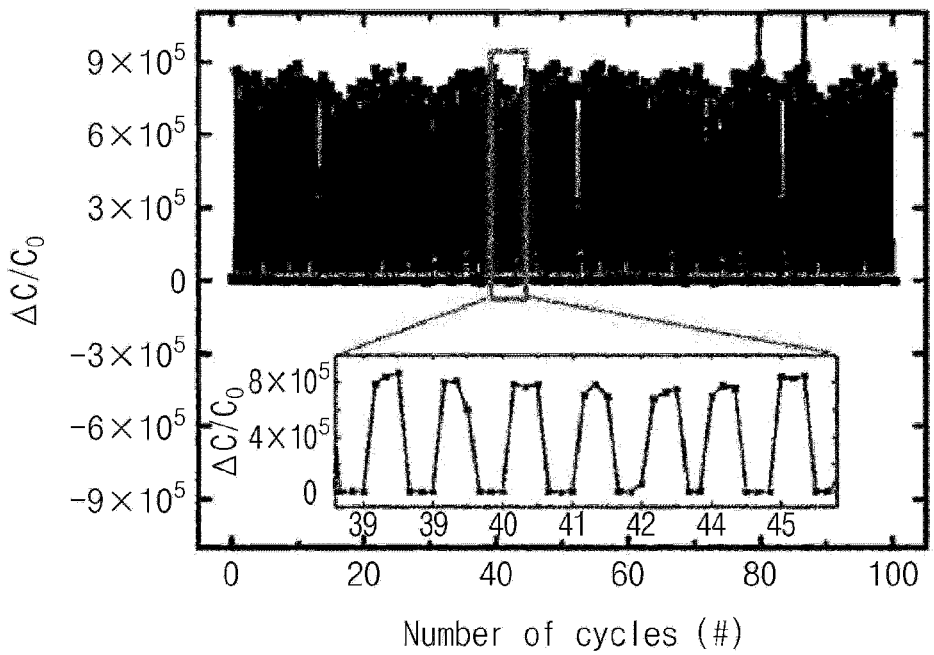

[Fig. 27]
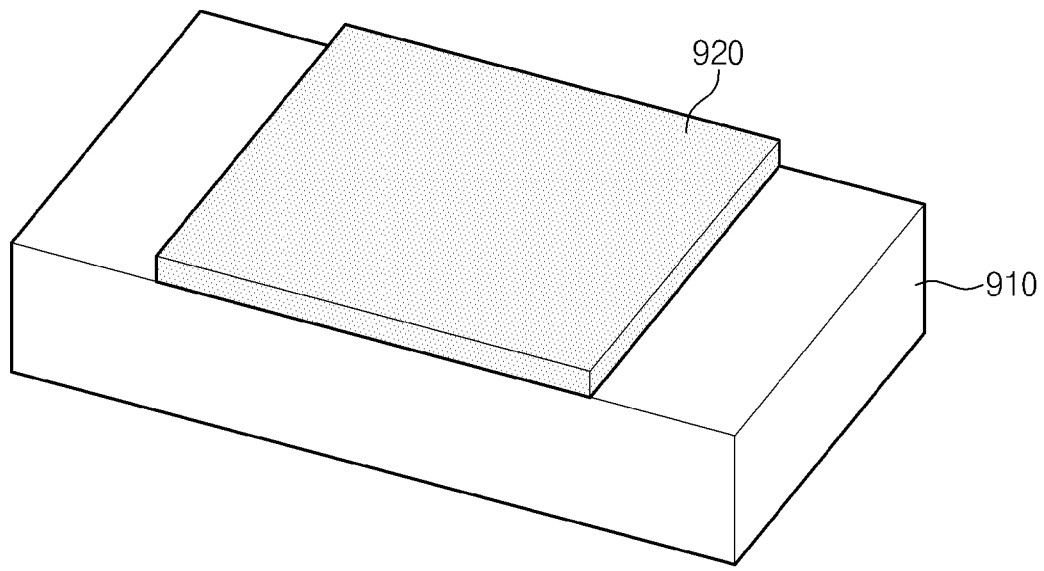
[Fig. 28]
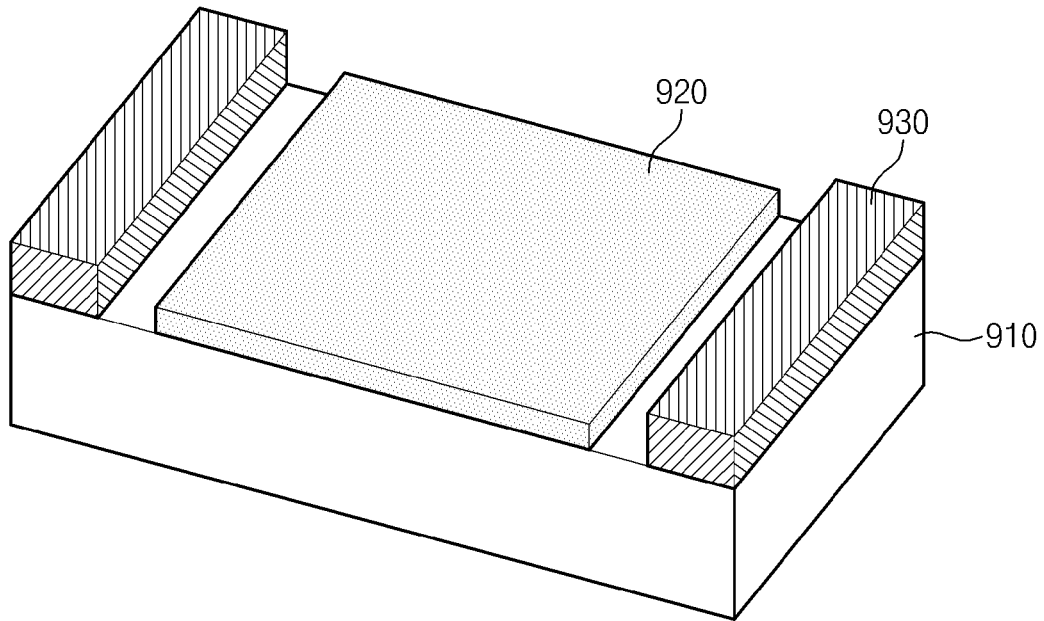

[Fig. 29]
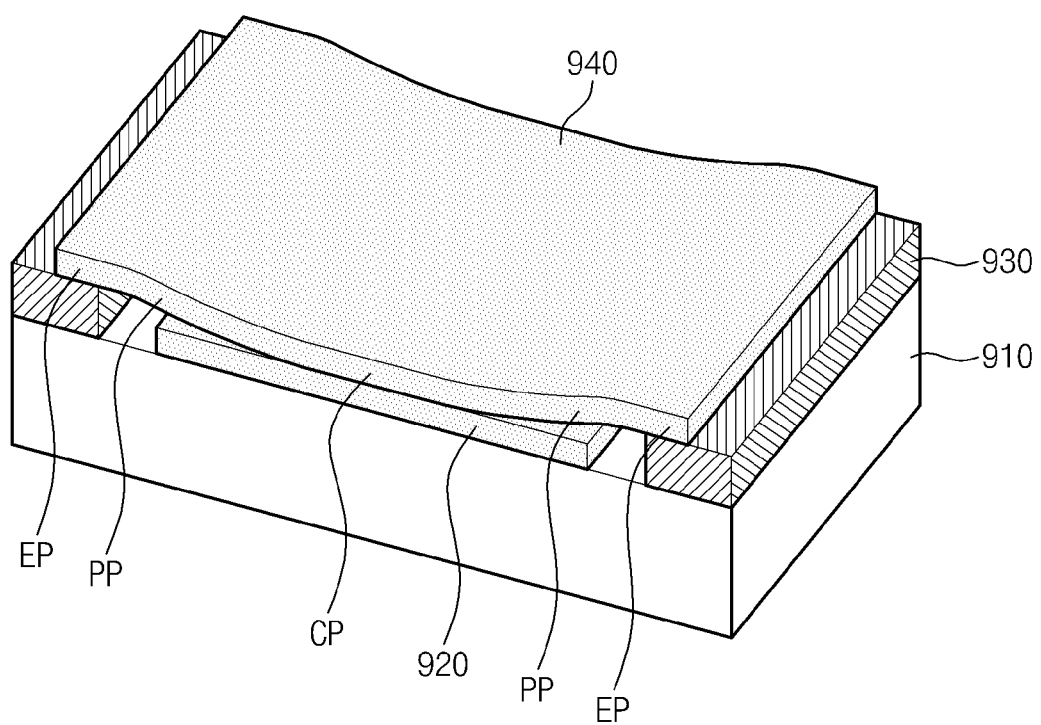

[Fig. 30]
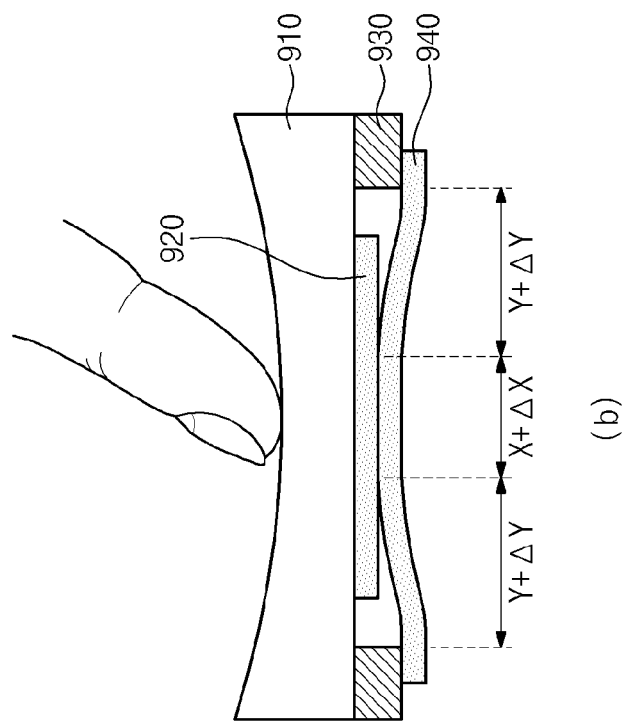
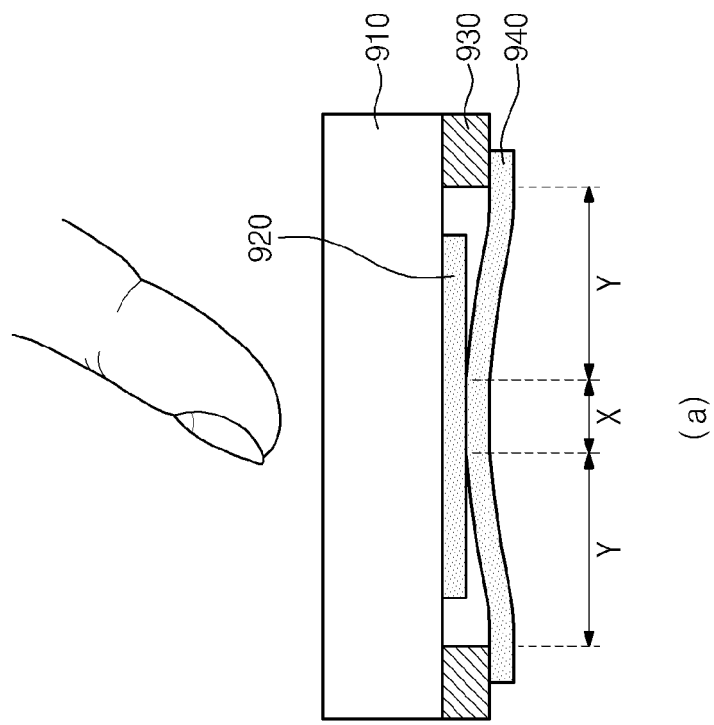

[Fig. 31]
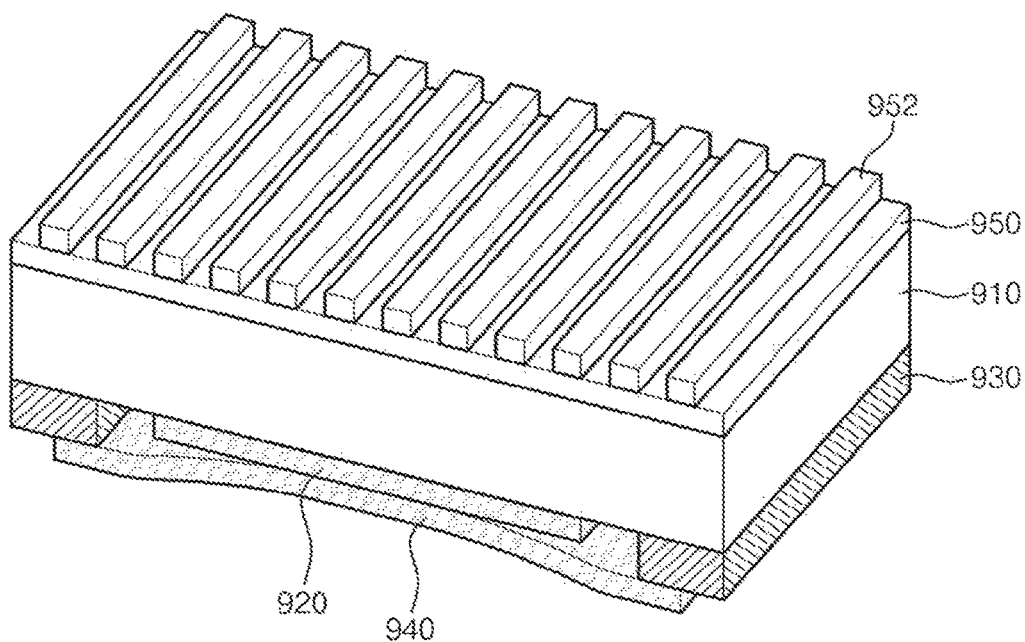
[Fig. 32]
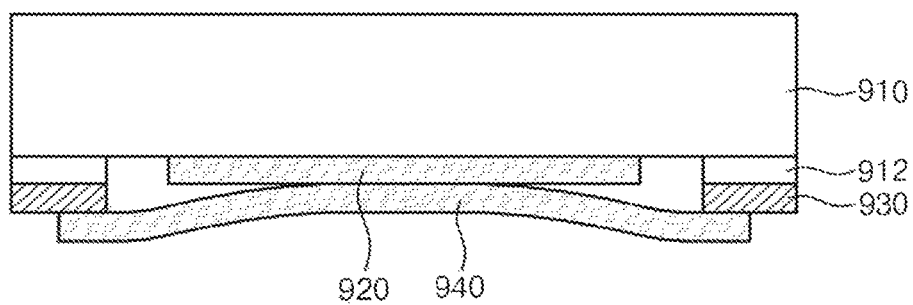
[Fig. 33]
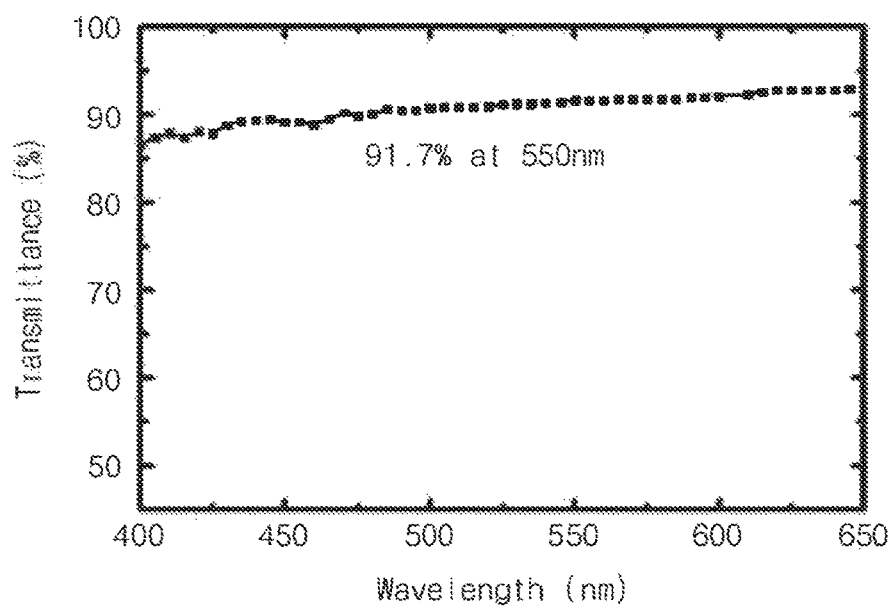

[Fig. 34]
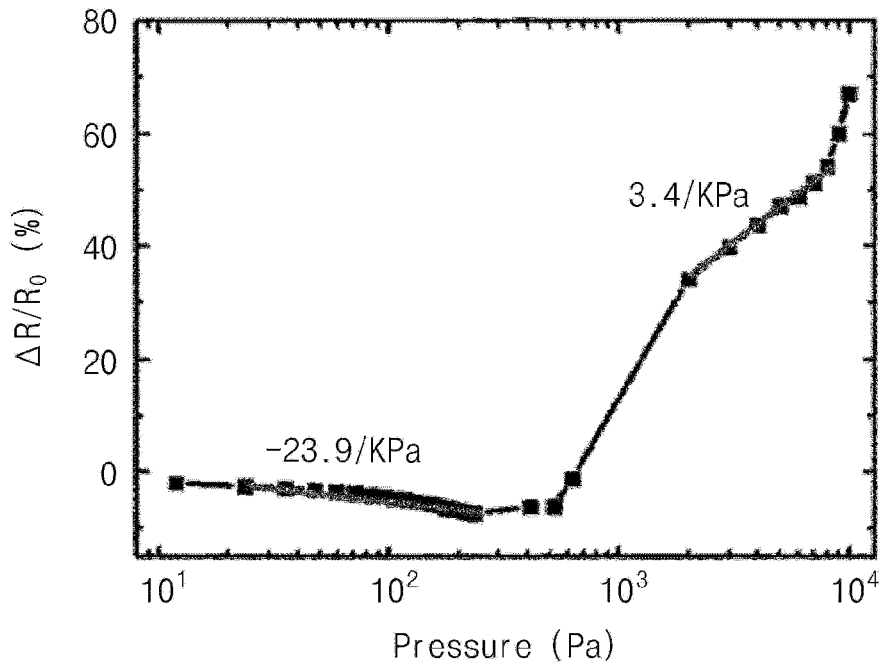
[Fig. 35]
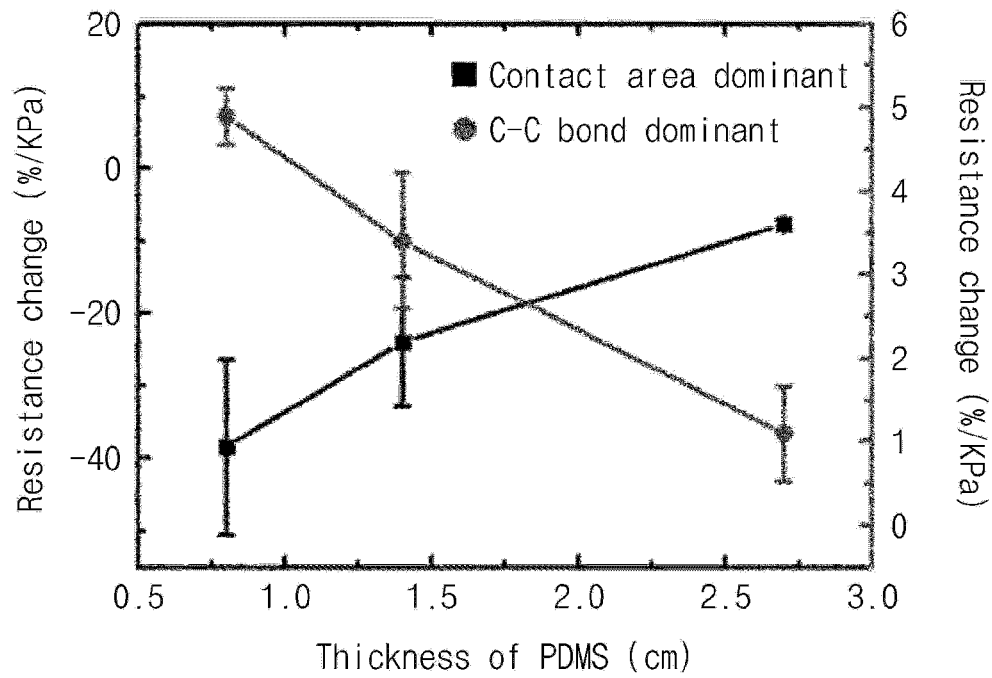

[Fig. 36]
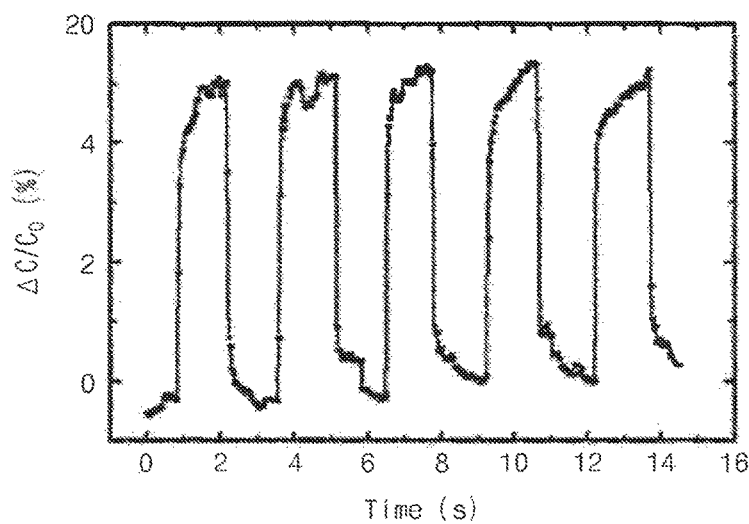
[Fig. 37]
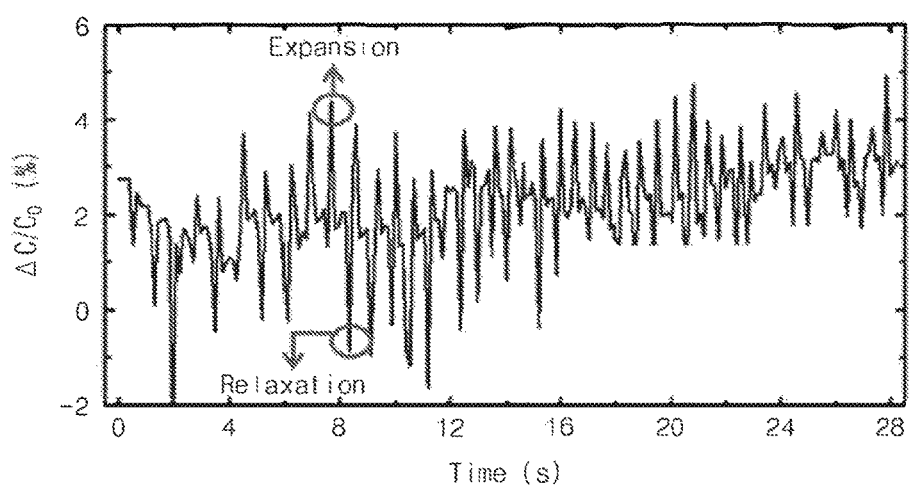

[Fig. 38]
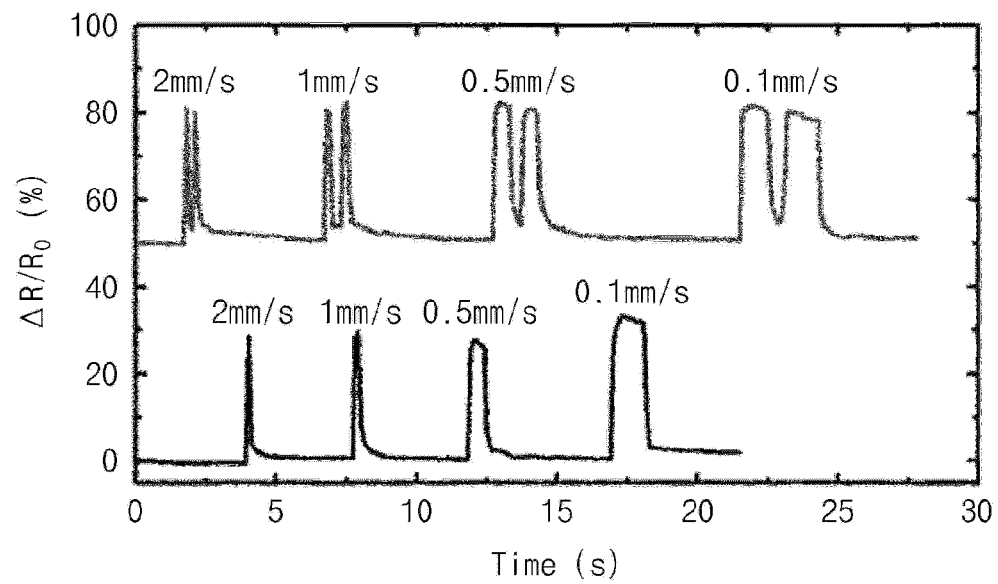
[Fig. 39]
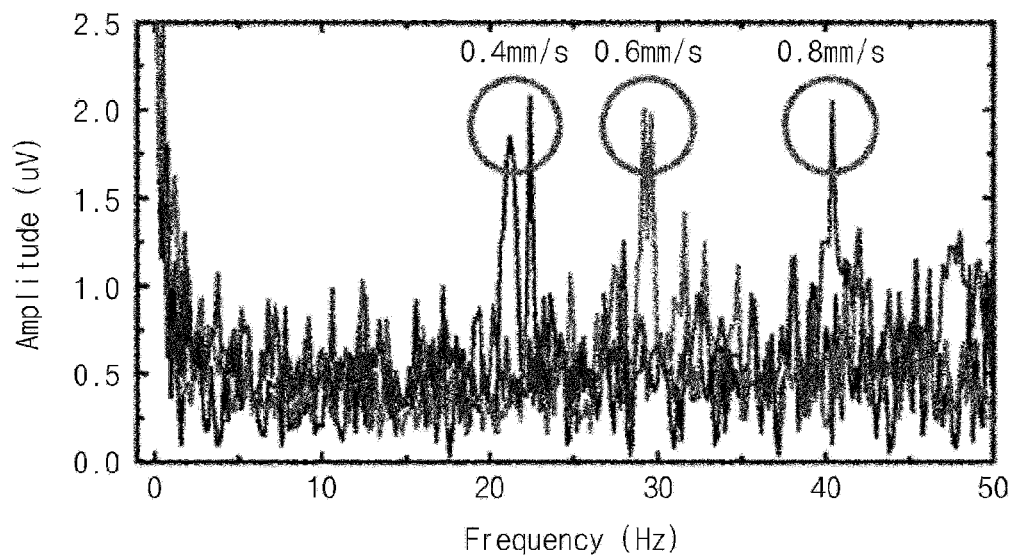

[Fig. 40]
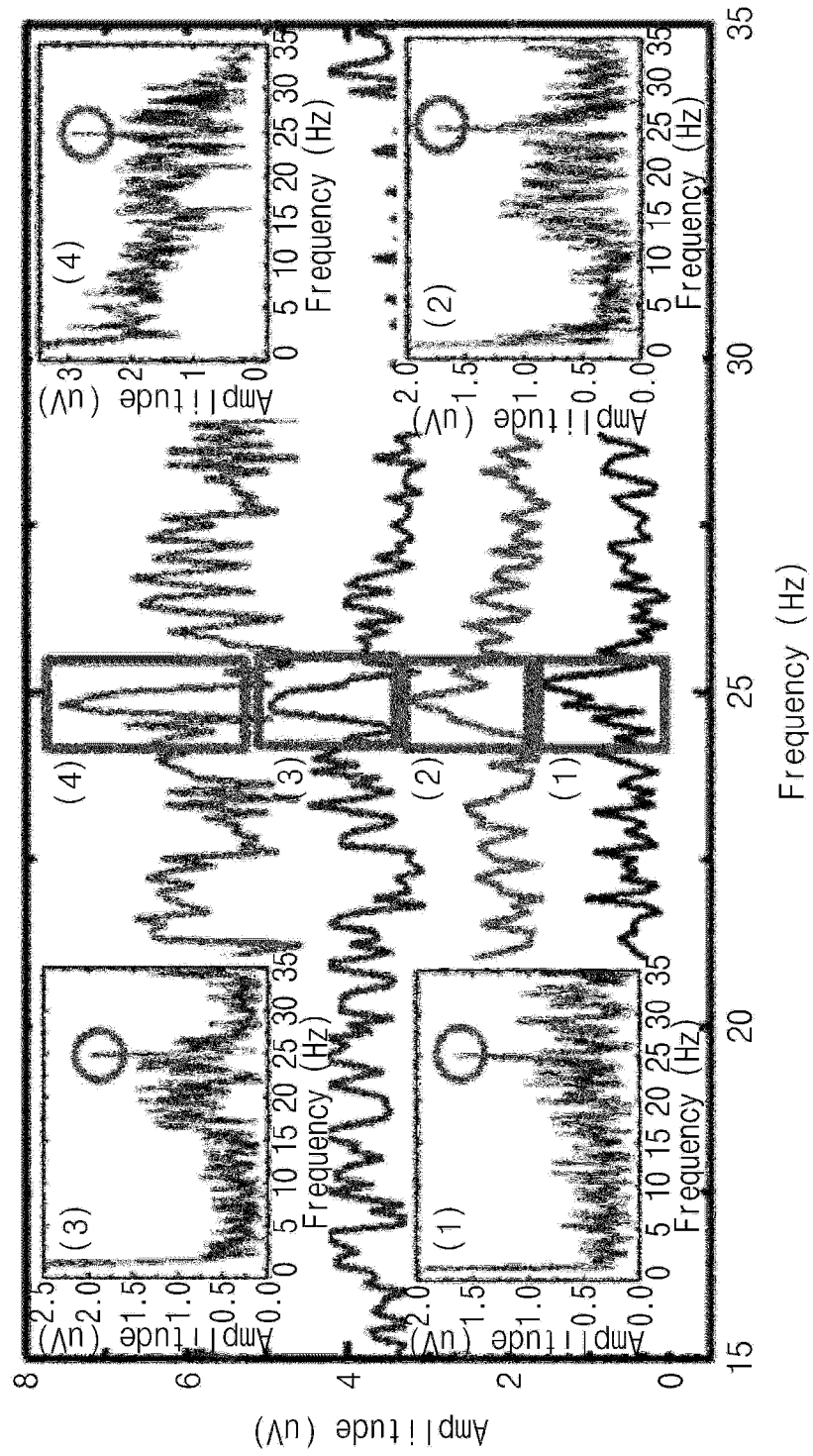

GRAPHENE TOUCH SENSOR, METHOD FOR OPERATING SAME, AND METHOD FOR MANUFACTURING SAME

BACKGROUND

1. Field

Embodiments of the inventive concepts relate to a graphene touch sensor, a method for operating the same, and a method for manufacturing the same.

2. Description of the Related Art

The development of devices based on a touch becomes an important issue due to the rapid development of mobile devices and efforts to imitate a human touch. A touch sensor and a wearable electronic device ever invented have been developed to sense a touch. In particular, a material used in the touch sensor is ITO disposed on a silicon or glass substrate. The touch sensor using the ITO material is not flexible, and thus there is a limit to apply the touch sensor using the ITO material to a wearable device and a curved display device.

Thus, touch sensors using new materials (e.g., a nanowire, a carbon nanotube, and graphene) are being developed. For example, Korean Patent Publication No. 10-2013-0091493 (Application No. 10-2012-0012817) discloses a graphene touch panel having an excellent warpage characteristic, a low manufacturing cost, and a large area by using an organic insulator and a graphene pattern layer patterned using a polymer stamp and an organic solvent, and a method of manufacturing the same.

However, these graphene touch sensors have low sensitivities and sense only whether or not an object touches the sensor. In other words, the graphene touch sensors do not sense a texture of the object. Thus, it is required to research and develop a touch sensor that can have excellent sensitivity and flexibility and can sense a surface characteristic (a texture) of an object.

SUMMARY

Embodiments of the inventive concepts may provide a highly reliable graphene touch sensor, a method for operating the same, and a method for manufacturing the same.

Embodiments of the inventive concepts may also provide a flexible graphene touch sensor, a method for operating the same, and a method for manufacturing the same.

Embodiments of the inventive concepts may also provide a high-sensitivity graphene touch sensor, a method for operating the same, and a method for manufacturing the same.

Embodiments of the inventive concepts may also provide a graphene touch sensor capable of sensing a texture of a touching object, a method for operating the same, and a method for manufacturing the same.

Embodiments of the inventive concepts may also provide a transparent graphene touch sensor and a method for manufacturing the same.

In an aspect, a graphene touch sensor may include a first substrate, a first pattern disposed on the first substrate and having a first protruding region and a first concave region, a second substrate on the first substrate, a second pattern disposed on the second substrate to face the first pattern and having a second protruding region and a second concave region, and a graphene layer between the first pattern and the second pattern.

In some embodiments, the first protruding region and the second concave region may be disposed to face each other, and the first concave region and the second protruding region may be disposed to face each other.

In some embodiments, the second substrate may include one surface on which the second pattern is disposed, and another surface opposite to the one surface. The graphene touch sensor may further include an upper substrate disposed on the another surface of the second substrate and having a sensing pattern.

In some embodiments, the sensing pattern may include a plurality of lines spaced apart from each other and extending in one direction, and the plurality of lines may have widths equal to each other.

In some embodiments, each of the first and second patterns may include a plurality of lines extending in one direction.

In some embodiments, one of the first and second patterns may include a plurality of dots spaced apart from each other so as to be two-dimensionally arranged, and the other of the first and second patterns may have a mesh shape capable of receiving the plurality of dots.

In some embodiments, a width of the first pattern may be equal to a space between the second patterns adjacent to each other, and a width of the second pattern may be equal to a space between the first patterns adjacent to each other.

In some embodiments, the first and second patterns may be formed of an insulating material.

In another aspect, a graphene touch sensor may include a first substrate, a first graphene pattern disposed on the first substrate and including a first segment and a second segment, a second substrate on the first substrate, and a second graphene pattern disposed between the first substrate and the second substrate. Electrical connection between the first and second segments by the second graphene pattern may be adjusted according to whether or not an object touches the graphene touch sensor.

In some embodiments, the graphene touch sensor may further include a separation layer disposed between the first and second graphene patterns and having an opening exposing the second graphene pattern.

In some embodiments, a groove intersecting the opening of the separation layer may be defined between the first segment and the second segment.

In some embodiments, the first segment and the second segment may be electrically disconnected from each other by the groove when the object does not touch the graphene touch sensor.

In some embodiments, when the object touches the graphene touch sensor, a portion of the first segment adjacent to the groove and a portion of the second segment adjacent to the groove may be in contact with the second graphene pattern such that the first segment and the second segment may be electrically connected to each other.

In some embodiments, the groove may extend in a first direction, and the second graphene pattern may have a line shape extending in a second direction intersecting the first direction.

In some embodiments, the graphene touch sensor may further include electrode layers between the first segment and the separation layer and between the second segment and the separation layer.

In still another aspect, a graphene touch sensor may include a base substrate having a first surface and a second surface opposite to the first surface, a first graphene pattern on the first surface of the base substrate, and a second graphene pattern disposed on the first graphene pattern. A contact area between the first and second graphene patterns may be adjusted according to a touch of an object to the second surface.

In some embodiments, the second graphene pattern may include a center portion and a peripheral portion not being in contact with the first graphene pattern. A contact area between the center portion and the first graphene pattern may be adjusted according to the touch of the object to the second surface.

In some embodiments, the graphene touch sensor may further include electrode layers disposed at both sides of the first graphene pattern. The electrode layers may be spaced apart from the first graphene pattern and may be connected to the second graphene pattern. The second graphene pattern may further include an edge portion disposed on the electrode layers.

In some embodiments, a distance between the first surface of the base substrate and top surfaces of the electrode layers may be greater than a distance between the first surface of the base substrate and a top surface of the first graphene pattern.

In some embodiments, the graphene touch sensor may further include structures disposed between the base substrate and the electrode layers. The structures and the base substrate may be in one body, and the structures may protrude from the first surface of the base substrate on which the first graphene pattern is disposed.

BRIEF DESCRIPTION OF THE DRAWINGS

FIG. 1 is a view illustrating a first substrate structure of a graphene touch sensor according to a first embodiment of the inventive concepts and a method for manufacturing the same.

FIGS. 2 and 3 are views illustrating a second substrate structure of the graphene touch sensor according to the first embodiment of the inventive concepts and a method for manufacturing the same.

FIG. 4 is a view illustrating an upper substrate of the graphene touch sensor according to the first embodiment of the inventive concepts and a method for manufacturing the same.

FIG. 5 is a view illustrating the graphene touch sensor according to the first embodiment of the inventive concepts and a method for manufacturing the same.

FIG. 6 is a view illustrating a method for operating the graphene touch sensor according to the first embodiment of the inventive concepts.

FIGS. 7 and 8 are views illustrating a modified example of first and second patterns included in the graphene touch sensor according to the first embodiment of the inventive concepts.

FIG. 9 is a graph illustrating a response characteristic of the graphene touch sensor when a constant pressure is periodically applied to the graphene touch sensor according to the first embodiment of the inventive concepts.

FIG. 10 is a graph illustrating a response characteristic according to pressure applied to the graphene touch sensor according to the first embodiment of the inventive concepts.

FIG. 11 is a graph illustrating a continuous response characteristic of the graphene touch sensor according to the first embodiment of the inventive concepts.

FIG. 12 is a graph illustrating a response characteristic according to a touch speed of an object touching the graphene touch sensor according to the first embodiment of the inventive concepts.

FIG. 13 is a graph illustrating characteristics of the graphene touch sensor according to an intensity of pressure applied to the graphene touch sensor according to the first embodiment of the inventive concepts.

FIG. 14 is a graph illustrating characteristics of the graphene touch sensor according to a texture of an object touching the graphene touch sensor according to the first embodiment of the inventive concepts.

FIG. 15 is a view illustrating a first substrate structure of a graphene touch sensor according to a second embodiment of the inventive concepts and a method for manufacturing the same.

FIGS. 16 and 17 are views illustrating a second substrate structure included in the graphene touch sensor according to the second embodiment of the inventive concepts and a method for manufacturing the same.

FIGS. 18 to 20 are views illustrating the graphene touch sensor of the second embodiment of the inventive concepts using the first substrate structure and the second substrate structure and a method for manufacturing the same.

FIG. 21 illustrates measured transmittances of the first and second substrate structures manufactured by the method for manufacturing the graphene touch sensor according to the second embodiment of the inventive concepts.

FIG. 22 illustrates a surface roughness of a second substrate manufactured by the method for manufacturing the graphene touch sensor according to the second embodiment of the inventive concepts.

FIG. 23 is a graph illustrating a response characteristic of the graphene touch sensor when a constant pressure is periodically applied to the graphene touch sensor according to the second embodiment of the inventive concepts.

FIG. 24 is a graph illustrating a response characteristic of the graphene touch sensor when a pressure having a relatively high frequency is periodically applied to the graphene touch sensor according to the second embodiment of the inventive concepts.

FIG. 25 is a graph illustrating a response characteristic of the graphene touch sensor when a variable pressure is applied to the graphene touch sensor according to the second embodiment of the inventive concepts.

FIG. 26 is a graph illustrating a continuous response characteristic of the graphene touch sensor according to the second embodiment of the inventive concepts.

FIGS. 27 to 29 are views illustrating a graphene touch sensor according to a third embodiment of the inventive concepts and a method for manufacturing the same.

FIG. 30 is a view illustrating a touch sensing method of the graphene touch sensor according to the third embodiment of the inventive concepts.

FIG. 31 is a view illustrating the graphene touch sensor including a sensing pattern according to the third embodiment of the inventive concepts.

FIG. 32 is a view illustrating a graphene touch sensor according to a modified example of the third embodiment of the inventive concepts and a method for manufacturing the same.

FIG. 33 is a graph illustrating a measured transmittance of the graphene touch sensor according to the third embodiment of the inventive concepts.

FIG. 34 is a graph illustrating a sensing characteristic of the graphene touch sensor according to the third embodiment of the inventive concepts.

FIG. 35 is a graph illustrating a characteristic change according to a thickness of a base substrate used in the graphene touch sensor according to the third embodiment of the inventive concepts.

FIG. 36 is a graph illustrating a response characteristic of the graphene touch sensor when a constant pressure is periodically applied to the graphene touch sensor according to the third embodiment of the inventive concepts.

FIG. 37 is a graph illustrating a human pulse measured using the graphene touch sensor according to the third embodiment of the inventive concepts.

FIG. 38 is a graph illustrating a response characteristic according to a touch speed of an object touching the graphene touch sensor, to which a sensing pattern is adhered, according to the third embodiment of the inventive concepts.

FIG. 39 is a graph illustrating frequencies converted from measured results to explain the response characteristic according to the touch speed of the object touching the graphene touch sensor, to which the sensing pattern is adhered, according to the third embodiment of the inventive concepts.

FIG. 40 is a graph illustrating characteristics of the graphene touch sensor according to an intensity of pressure applied to the graphene touch sensor, to which the sensing pattern is adhered, according to the third embodiment of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Furthermore, "a touch sensor" used herein may sense whether or not an object touches the sensor, a touch intensity of an object, and a touch speed of an object and may sense a surface characteristic (a texture) of an object. As used herein, the term "touch" means that an object directly touches a sensor and/or that an object indirectly touches a sensor.

A graphene touch sensor according to a first embodiment of the inventive concepts, a method for manufacturing the same, and a method for operating the same will be described hereinafter.

FIG. 1 is a view illustrating a first substrate structure of a graphene touch sensor according to a first embodiment of the inventive concepts and a method for manufacturing the same.

Referring to FIG. 1, a first substrate structure is provided. The first substrate structure includes a first substrate 100 and a first pattern 110 on the first substrate 100. The first substrate 100 may be a flexible substrate. For example, the first substrate 100 may be PET, PES, PI, PEN, or PDMS.

The first pattern 110 may be formed on the first substrate 100. Forming the first pattern 110 may include forming a material layer on the first substrate 100, forming a photoresist pattern on the material layer, and patterning the material layer using the photoresist pattern. The material layer may be formed of an insulating material. For example, the material layer may be formed of silicon oxide, silicon nitride, silicon oxynitride, or aluminum oxide.

The first pattern 110 may include a plurality of lines extending in one direction. The plurality of lines may be spaced apart from each other and may be arranged at equal intervals. Widths of the plurality of lines may be substantially equal to each other. Heights of the plurality of lines may be substantially equal to each other. In some embodiments, the width of the first pattern 110 may be substantially equal to a space between the first patterns 110 adjacent to each other.

The first pattern 110 may include a first protruding region 110a and a first concave region 110b. The first protruding region 110a may be defined on a top surface of the first pattern 110. The first concave region 110b may be defined between the first patterns 110 adjacent to each other. In other words, the first concave region 110b may be defined on a top surface of the first substrate 100 exposed between the first patterns 110. A plurality of the first protruding regions 110a and a plurality of the first concave regions 110b may be provided on the first substrate 100 by the first patterns 110.

FIGS. 2 and 3 are views illustrating a second substrate structure of the graphene touch sensor according to the first embodiment of the inventive concepts and a method for manufacturing the same.

Referring to FIG. 2, a second substrate 200 is provided. The second substrate 200 may be a flexible substrate. For example, the second substrate 200 may be PET, PES, PI, PEN, or PDMS.

A second pattern 210 may be formed on one surface of the second substrate 200. The second pattern 210 may be formed by the same method as the method of forming the first pattern 110, which is described with reference to FIG.

1. The second pattern 210 may be formed of the same material as the first pattern 110.

The second pattern 210 may include a plurality of lines extending in one direction. The plurality of lines may be spaced apart from each other and may be arranged at equal intervals. Widths of the plurality of lines may be substantially equal to each other. Heights of the plurality of lines may be substantially equal to each other. In some embodiments, the width of the second pattern 210 may be substantially equal to a space between the second patterns 210 adjacent to each other.

The second pattern 210 may include a second protruding region 210a and a second concave region 210b. The second protruding region 210a may be defined on a top surface of the second pattern 210. The second concave region 210b may be defined between the second patterns 210 adjacent to each other. In other words, the second concave region 210b may be defined on a top surface of the second substrate 200 exposed between the second patterns 210. A plurality of the second protruding regions 210a and a plurality of the second concave regions 210b may be provided on the second substrate 200 by the second patterns 210.

Referring to FIG. 3, a graphene layer 220 may be transferred on the second pattern 210. Transferring the graphene layer 220 onto the second pattern 210 may include preparing a metal thin layer having the graphene layer 220, coating a top surface of the graphene layer 220 with a sacrificial layer, removing the metal thin layer from the graphene layer 220, disposing the sacrificial layer and the graphene layer 220 on the second pattern 210 to bring the graphene layer 220 into contact with the second pattern 210, and removing the sacrificial layer. For example, the metal thin layer may be a copper (Cu) thin layer, and the sacrificial layer may be formed of PMMA. For example, the metal thin layer may be removed using a $FeCl_3$ solution and HCl, and the sacrificial layer may be removed by acetone.

Electrode layers 230 may be formed on the second pattern 210 after transferring the graphene layer 220 onto the second pattern 210. The electrode layers 230 may be electrically connected to both sides of the graphene layer 220. For example, the electrode layers 230 may include chromium (Cr) and/or gold (Au) formed by a deposition method.

A second substrate structure may be provided by the method described above. The second substrate structure may include the second substrate 200, the second pattern 210 on the second substrate 200, the graphene layer 220 on the second pattern 210, and the electrode layers 230 disposed at both sides of the graphene layer 220.

FIG. 4 is a view illustrating an upper substrate of the graphene touch sensor according to the first embodiment of the inventive concepts and a method for manufacturing the same.

Referring to FIG. 4, an upper substrate 300 having a sensing pattern 310 is prepared. According to some embodiments of the inventive concepts, preparing the upper substrate 300 having the sensing pattern 310 may include preparing a substrate having a flat top surface, forming a photoresist pattern on the top surface of the substrate, and patterning the substrate using the photoresist pattern. In this case, the sensing pattern 310 and the upper substrate 300 may constitute one body. In this case, a boundary line between the sensing pattern 310 and the upper substrate 300 may be omitted unlike FIG. 3.

Alternatively, in other embodiments, preparing the upper substrate 300 having the sensing pattern 310 may include forming a material layer on a substrate, forming a photoresist pattern on the material layer, and patterning the material layer using the photoresist pattern.

The sensing pattern 310 may include a plurality of lines extending in one direction. The plurality of lines may be spaced apart from each other and may be arranged at equal intervals. Widths of the plurality of lines may be substantially equal to each other. Heights of the plurality of lines may be substantially equal to each other. In some embodiments, the width of the sensing pattern 310 may be substantially equal to a space between the sensing patterns 310 adjacent to each other.

FIG. 5 is a view illustrating the graphene touch sensor according to the first embodiment of the inventive concepts and a method for manufacturing the same. FIG. 6 is a view illustrating a method for operating the graphene touch sensor according to the first embodiment of the inventive concepts.

Referring to FIGS. 5 and 6, the graphene touch sensor according to an embodiment of the inventive concepts may include the first substrate structure described with reference to FIG. 1, the second substrate structure described with reference to FIGS. 2 and 3, and the upper substrate 300 having the sensing pattern 310 described with reference to FIG. 4.

The second substrate 200 may be disposed on the first substrate 100 in such a way that the first pattern 110 faces the second pattern 210. The first protruding region 110a may be disposed to face the second concave region 210b, and the first concave region 110b may be disposed to face the second protruding region 210a. In other words, the second substrate 200 may be disposed on the first substrate 100 in such a way that the first and second patterns 110 and 210 including the concave and protruding regions are interlocked with each other.

The width of the first pattern 110 may be substantially equal to a distance between the second patterns 210 adjacent to each other (i.e., the width of the second concave region 210b). The width of the second pattern 210 may be substantially equal to a distance between the first patterns 110 adjacent to each other (i.e., the width of the first concave region 110b). Thus, the first pattern 110 and the second pattern 210 may be interlocked with each other in the form of a toothed wheel.

The upper substrate 300 may be disposed on another surface of the second substrate 200, which is opposite to the one surface of the second substrate 200 (on which the second pattern 210 is formed). The sensing pattern 310 may be exposed outward.

When an object becomes in contact with the sensing pattern 310 of the graphene touch sensor according to the embodiment of the inventive concepts, the graphene layer 220 disposed between the first and second patterns 110 and 210 may be physically deformed. A resistance of the graphene layer 220 may be changed by the physical deformation of the graphene layer 220. Whether or not the object touches the sensor, a touch intensity of the object, and/or a touch speed of the object may be sensed by sensing the resistance change of the graphene layer 220.

In addition, when a specific pattern is on a surface of the object, the resistance of the graphene layer 220 may be changed according to the specific pattern existing on the surface of the object by contact between the surface of the object and the sensing pattern 310. Thus, it is possible to provide the graphene touch sensor capable of sensing a texture of the object by the resistance change of the graphene layer 220 according to a surface characteristic of the object, and the method for manufacturing the same.

Furthermore, the first and second patterns 110 and 210 having the concave and protruding regions may be interlocked with each other, thereby increasing a degree of the physical deformation of the graphene layer 220 between the first and second patterns 110 and 210. As a result, it is possible to provide the graphene touch sensor with improved sensitivity and the method for manufacturing the same.

Unlike the aforementioned embodiment, one of the first and second patterns may include a plurality of dots, and the other of the first and second patterns may have a mesh shape capable of receiving the plurality of dots. These will be described with reference to FIGS. 7 and 8.

FIGS. 7 and 8 are views illustrating a modified example of first and second patterns included in the graphene touch sensor according to the first embodiment of the inventive concepts.

Referring to FIG. 7, a first pattern 410 may be disposed on a first substrate 400. The first substrate 400 may be the same as the first substrate 100 described with reference to FIG. 1. The first pattern 410 may be formed by the same method as the first pattern 110 described with reference to FIG. 1.

The first pattern 410 may include a plurality of dots. The plurality of dots may be spaced apart from each other and may be two-dimensionally arranged on the first substrate 400. In detail, the plurality of dots may be arranged to constitute rows parallel to one direction and columns parallel to another direction intersecting the one direction.

The first pattern 410 may include a first protruding region 410a and a first concave region 410b. The first protruding region 410a may be defined on a top surface of the first pattern 410. The first concave region 410b may be defined between the first patterns 410 adjacent to each other. In other words, the first concave region 410b may be defined on a top surface of the first substrate 400 exposed between the first patterns 410. A plurality of the first protruding regions 410a and a plurality of the first concave regions 410b may be provided on the first substrate 400 by the first patterns 410.

Referring to FIG. 8, a second pattern 510 may be disposed on a second substrate 500. The second substrate 500 may be the same as the first substrate 100 described with reference to FIG. 1. The second pattern 510 may be formed by the same method as the first pattern 110 described with reference to FIG. 1.

The second pattern 510 may have a mesh shape capable of receiving the first pattern 410 including the plurality of dots. The second pattern 510 may include a second protruding region 510a and a second concave region 510b. The second protruding region 510a may be defined on a top surface of the second pattern 510. The second concave region 510b may be defined on a top surface of the second substrate 500 exposed by the second pattern 510.

As described with reference to FIG. 3, a graphene layer may be transferred to the first pattern 410 or the second pattern 510. Thereafter, the first substrate 400 and the second substrate 500 may be disposed in such a way that the first protruding region 410a of the first pattern 410 faces the second concave region 510b of the second pattern 510 and the first concave region 410b of the first pattern 410 faces the second protruding region 510a of the second pattern 510.

In FIG. 7, the first pattern 410 has a quadrilateral shape in a plan view. However, in other embodiments, the first pattern 410 may have a circular shape, a triangular shape, or other polygonal shape. In this case, the second pattern 510 may have a mesh shape having a circular, triangular or polygonal receiving portion capable of receiving the first pattern 410.

FIG. 9 is a graph illustrating a response characteristic of the graphene touch sensor when a constant pressure is periodically applied to the graphene touch sensor according to the first embodiment of the inventive concepts.

Referring to FIG. 9, a graphene touch sensor was manufactured to have a first pattern (silicon oxide ($SiO_2$)), a second pattern (silicon oxide ($SiO_2$)) interlocked with the first pattern, and a graphene layer between the first pattern and the second pattern. A constant pressure was periodically applied to the graphene touch sensor to measure a resistance change of the graphene layer. In the graph of FIG. 9, "$R_0$" denotes a resistance of the graphene layer when the graphene layer is not physically deformed. In the graph of FIG. 9, "$\Delta R$" denotes a resistance change amount of the graphene layer physically deformed by pressure applied when an object touches the graphene touch sensor.

It is recognized that a response ($\Delta R/R_0$) characteristic of the graphene touch sensor according to the embodiment of the inventive concepts is substantially constant in the event that the constant pressure is periodically applied. In other words, the reliability of the response characteristic of the graphene touch sensor using the graphene layer may be confirmed.

FIG. 10 is a graph illustrating a response characteristic according to pressure applied to the graphene touch sensor according to the first embodiment of the inventive concepts.

Referring to FIG. 10, pressure was applied to the graphene touch sensor manufactured according to the embodiment of the inventive concepts while changing the pressure. A response ($\Delta R/R_0$) characteristic of the graphene touch sensor according to the changed pressure was measured. As shown in FIG. 10, the response ($\Delta R/R_0$) of the graphene touch sensor increases as the applied pressure increases, and the response ($\Delta R/R_0$) of the graphene touch sensor decreases as the applied pressure decreases. In other words, the response ($\Delta R/R_0$) of the graphene touch sensor may be changed in response to an intensity of the applied pressure, and a touch intensity of an object touching the graphene touch sensor may be measured using these response characteristics of the graphene touch sensor.

FIG. 11 is a graph illustrating a continuous response characteristic of the graphene touch sensor according to the first embodiment of the inventive concepts.

Referring to FIG. 11, pressure was periodically applied 1,000 times to the graphene touch sensor according to the embodiment of the inventive concepts, thereby measuring a response ($\Delta R/R_0$) characteristic of the graphene touch sensor. As shown in FIG. 11, the response characteristic of the graphene touch sensor is not deteriorated by the periodical pressure of 1,000 times, and the graphene touch sensor shows a reliable response ($\Delta R/R_0$) characteristic.

FIG. 12 is a graph illustrating a response characteristic according to a touch speed of an object touching the graphene touch sensor according to the first embodiment of the inventive concepts.

Referring to FIG. 12, a single PET tip touched the graphene touch sensor according to the embodiment of the inventive concepts, which had a sensing pattern having a width of 100 μm, a space of 100 μm and a thickness of 100 μm, at speeds of $0.6 \times 10^{-4}$ m/s, $0.9 \times 10^{-4}$ m/s, $1.2 \times 10^{-4}$ m/s and $2.4 \times 10^{-4}$ m/s (e.g., the PET tip scanned the graphene touch sensor in one direction in a state in which the PEP tip was in contact with the graphene touch sensor). It is recognized that the response ($\Delta R/R_0$) characteristic of the graphene touch sensor is changed according to the touch speed of the PET tip touching the sensing pattern of the graphene touch sensor. In other words, a touch speed of an object may be sensed using the graphene touch sensor according to the embodiment of the inventive concepts.

FIG. 13 is a graph illustrating characteristics of the graphene touch sensor according to an intensity of pressure applied to the graphene touch sensor according to the first embodiment of the inventive concepts.

Referring to FIG. 13, a single PET tip having a thickness of 125 μm touched the graphene touch sensor according to the embodiment of the inventive concepts, which had a sensing pattern having a width of 100 μm, a space of 100 μm and a thickness of 100 μm, while changing pressure. The touch results were converted into frequencies. The pressures of the PET tip touching the graphene touch sensor were greater in the order of (1), (2), (3), and (4) illustrated in FIG. 13. As shown in FIG. 13, when the touch pressures were different from each other, output amplitude different from each other were measured to correspond to the touch pressures. In other words, it may be recognized that a touch pressure of an object may be sensed using the graphene touch sensor according to the embodiment of the inventive concepts.

FIG. 14 is a graph illustrating characteristics of the graphene touch sensor according to a texture of an object touching the graphene touch sensor according to the first embodiment of the inventive concepts.

Referring to FIG. 14, paper, a hand, a first sample object having a period of 100 μm, and a second sample object having a period of 200 μm touched the graphene touch sensor according to the embodiment of the inventive concepts, which had a sensing pattern having a width of 100 μm, a space of 100 μm and a thickness of 100 μm, and the touch results were converted into frequencies. Graphs (a), (b), (c), and (d) of FIG. 14 show the touch results of the paper, the touch results of the hand, the touch results of the first sample object, and the touch results of the second sample object, respectively. As shown in the graph (a) of FIG. 14, when the substantially flat paper without a specific pattern disposed on a surface thereof touches the graphene touch sensor, a main peak does not occur. On the other hand, as shown in the graphs (b) to (d) of FIG. 14, when objects having specific patterns disposed on surfaces thereof touch the graphene touch sensor, main peaks occur. In other words, it may be recognized that a main peak according to a surface characteristic of an object may be analyzed to sense a texture (the surface characteristic) of the object.

A graphene touch sensor according to a second embodiment of the inventive concepts and a method for manufacturing the same will be described hereinafter.

FIG. 15 is a view illustrating a first substrate structure of a graphene touch sensor according to a second embodiment of the inventive concepts and a method for manufacturing the same.

Referring to FIG. 15, a first substrate structure is provided. The first substrate structure includes a first substrate 610, a first graphene pattern 622a and 622b on the first substrate 610, an adhesive layer 620a and 620b between the first substrate 610 and the first graphene pattern 622a and 622b, and electrode layers 630 on the first graphene pattern 622a and 622b.

The first substrate 610 may be a flexible substrate. For example, the first substrate 610 may be PET, PES, PI, PEN, or PDMS.

The first graphene pattern 622a and 622b may be transferred on the first substrate 610 by using the adhesive layer 620a and 620b. For example, transferring the first graphene pattern 622a and 622b may include preparing a metal thin layer (e.g., a copper thin layer) having a graphene layer, coating a top surface of the graphene layer with an adhesive layer (e.g., PMMA), dividing the metal thin layer, the graphene layer, and the adhesive layer into a first piece and a second piece, disposing the first and second pieces on the first substrate in such a way that the divided first and second pieces are spaced apart from each other and the adhesive layer is in contact with the first substrate, and removing the metal thin layer from the first and second pieces.

The first graphene pattern 622a and 622b may include a first segment 622a and a second segment 622b which are spaced apart from each other. In the aforementioned process of transferring the first graphene pattern 622a and 622b, the graphene layer included in the first piece may be defined as the first segment 622a, and the graphene layer included in the second piece may be defined as the second segment 622b.

A groove may be defined between the first segment 622a and the second segment 622b. The groove may extend in a first direction. The first segment 622a and the second segment 622b may be physically and electrically separated from each other with the groove interposed therebetween. In some embodiments, a width of the groove may range from about 0.5 mm to about 1 mm.

The electrode layers 630 may be formed on the first segment 622a and the second segment 622b, respectively. The electrode layers 630 may cover a portion of the first segment 622a and a portion of the second segment 622b but may not cover another portion of the first segment 622a and another portion of the second segment 622b which are adjacent to the groove. In some embodiments, the electrode layers 630 may be formed of platinum (Pt) by using a sputtering process. For example, thicknesses of the electrode layers 630 may be about 100 nm.

FIGS. 16 and 17 are views illustrating a second substrate structure included in the graphene touch sensor according to the second embodiment of the inventive concepts and a method for manufacturing the same.

Referring to FIG. 16, a second substrate 710, 712, and 714 is prepared. The second substrate 710, 712, and 714 may include a base substrate 710, a planarization layer 712 on the base substrate 710, and an insulating layer 714 on the planarization layer 712. Thus, a surface roughness of a top surface, on which the graphene pattern is formed, of the insulating layer 714 may be minimized to provide a highly reliable graphene touch sensor.

The base substrate 710 may be a flexible substrate. For example, the base substrate 710 may be PET, PES, PI, PEN, or PDMS. For example, the planarization layer 712 may be PI, and the insulating layer 714 may be silicon oxide. In some embodiments, preparing the second substrate 710, 712, and 714 may include forming the planarization layer 712 by coating a top surface of the base substrate 710 with PI through a spin-coating process, and forming the insulating layer 714 by depositing a silicon oxide layer on the planarization layer 712 through a plasma-enhanced chemical vapor deposition (PECVD) process.

A graphene layer 720 may be transferred on the second substrate 710, 712, and 714. Transferring the graphene layer 720 may include preparing a metal thin layer (e.g., a copper thin layer) having the graphene layer 720, coating a top surface of the graphene layer 720 with a sacrificial layer (e.g., PMMA), removing the metal thin layer from the graphene layer 720, disposing the sacrificial layer and the graphene layer 720 on the insulating layer 714, and removing the sacrificial layer.

Referring to FIG. 17, next, the graphene layer 720 may be patterned to form a second graphene pattern 722 on the insulating layer 714 of the second substrate 710, 712, and 714. Thus, a second substrate structure including the second substrate 710, 712, and 714 and the second graphene pattern 722 may be provided.

In some embodiments, the graphene layer 720 may be patterned using a photolithography process. The second graphene pattern 722 may include a plurality of lines extending in one direction. The plurality of lines may have the same width and may be spaced apart from each other at equal intervals.

Alternatively, in other embodiments, the process of patterning the graphene layer 720 described with reference to FIG. 16 may be omitted, and the graphene layer 720 having a plate shape may be used as the second graphene pattern of the graphene touch sensor according to the embodiment of the inventive concepts.

FIGS. 18 to 20 are views illustrating the graphene touch sensor of the second embodiment of the inventive concepts using the first substrate structure and the second substrate structure and a method for manufacturing the same.

Referring to FIGS. 18 to 20, the first substrate structure described with reference to FIG. 15 may be coupled to the second substrate structure described with reference to FIGS. 16 and 17 with a separation layer 800 interposed therebetween. In more detail, the first graphene pattern 622a and 622b and the second graphene pattern 722 may be disposed to face each other, and the separation layer 800 may be disposed between the first graphene pattern 622a and 622b and the second graphene pattern 722.

In some embodiments, when the groove between the first and second segments 622a and 622b extends in the first direction, the first and second substrate structures may be coupled to each other in such a way that the extending direction (e.g., a second direction) of the second graphene pattern 722 intersects the first direction.

The separation layer 800 may be formed of an insulating material. For example, the separation layer 800 may be PET having a thickness of 125 μm. The separation layer 800 may have an opening 810. The opening 810 of the separation layer 800 may expose the first graphene pattern 622a and 622b and the second graphene pattern 722. In detail, the groove may intersect the opening 810, and the opening 810 may expose a portion of the first segment 622a and a portion of the second segment 622b which are adjacent to the groove.

In FIG. 18, the opening 810 of the separation layer 800 has a rectangular shape. However, in other embodiments, the opening 810 may have a circular shape, an elliptical shape, or other polygonal shape.

When an object does not touch the graphene touch sensor, the first segment 622a and the second segment 622b may be electrically disconnected from each other. On the other hand, when an object touches the graphene touch sensor, the portions of the first and second segments 622a and 622b adjacent to the groove may become in contact with the second graphene pattern 722 through the opening 810 of the separation layer 800, as illustrated in FIG. 20. Thus, the electrode layers 630 on the first and second segments 622a and 622b may be electrically connected to each other to sense whether or not the object touches the graphene touch sensor. As a result, it is possible to provide a graphene touch sensor with high reliability, high flexibility, and high sensitivity and the method for manufacturing the same.

FIG. 21 illustrates measured transmittances of the first and second substrate structures manufactured by the method for manufacturing the graphene touch sensor according to the second embodiment of the inventive concepts.

Referring to FIG. 21, a graph (a) of FIG. 21 shows a measured transmittance of a first substrate structure manufactured using PDMS as the first substrate and using PMMA as the adhesive layer, according to the embodiment of the inventive concepts. A measured transmittance of PDMS was 92.7% in a wavelength band of 550 nm, and a measured transmittance of the first substrate structure manufactured according to the embodiment of the inventive concepts was 86.3% in the wavelength band of 550 nm. The transmittance may not be greatly reduced even though the graphene pattern is formed, and thus the first substrate structure manufactured according to the embodiment of the inventive concepts may be used in a transparent graphene touch sensor.

A graph (b) of FIG. 21 shows a measured transmittance of a second substrate structure manufactured using PET, PI, and a silicon oxide layer, which are stacked, in the second substrate, according to the embodiment of the inventive concepts. The measured transmittance was 87% in a wavelength band of 550 nm. It may be recognized that the second substrate structure manufactured according to the embodiment of the inventive concepts is used in a transparent graphene touch sensor.

FIG. 22 illustrates a surface roughness of a second substrate manufactured by the method for manufacturing the graphene touch sensor according to the second embodiment of the inventive concepts.

Referring to FIG. 22, a view (a) of FIG. 22 shows a surface roughness measured after a planarization layer is omitted and a silicon oxide layer is formed on a PET substrate in the method for manufacturing the second substrate of FIGS. 16 and 1. A view (b) of FIG. 22 shows a surface roughness measured after a top surface of a PET substrate is coated with PI used as a planarization layer and a silicon oxide layer is formed according to the method for manufacturing the second substrate of FIGS. 16 and 17. When the planarization layer is omitted, a RMS value of the surface roughness was about 6.270 nm. However, when the planarization layer is used according to the embodiment of the inventive concepts, a RMS value of the surface roughness was about 5.005 nm. In other words, it may be recognized that the surface roughness is reduced using the planarization layer to improve reliability of the graphene touch sensor.

FIG. 23 is a graph illustrating a response characteristic of the graphene touch sensor when a constant pressure is periodically applied to the graphene touch sensor according to the second embodiment of the inventive concepts.

Referring to FIG. 23, a graphene touch sensor according to the embodiment of the inventive concepts was manufactured by forming PET having an opening, used as the separation layer, between the first substrate structure and the second substrate structure described with reference to FIGS. 18 to 20. A constant pressure was periodically applied to the graphene touch sensor to measure a capacitance change. In the graph of FIG. 23, "$C_0$" denotes a capacitance when an object does not touch the graphene touch sensor. In the graph of FIG. 23, "$\Delta C$" denotes a capacitance change amount when an object touches the graphene touch sensor.

It is recognized that a response characteristic ($\Delta C/C_0$) of the graphene touch sensor according to the embodiment of the inventive concepts is substantially constant in the event that the constant pressure is periodically applied. In other words, the reliability of the response characteristic of the graphene touch sensor according to the embodiment of the inventive concepts may be confirmed.

FIG. 24 is a graph illustrating a response characteristic of the graphene touch sensor when a pressure having a relatively high frequency is periodically applied to the graphene touch sensor according to the second embodiment of the inventive concepts.

Referring to FIG. 24, pressure having a relatively high frequency of 5 Hz was applied to the graphene touch sensor according to the embodiment of the inventive concepts described with reference to FIG. 23, and the response characteristic ($\Delta C/C_0$) was measured. It may be recognized that the response characteristic ($\Delta C/C_0$) of the graphene touch sensor is substantially constant even though the pressure of the relatively high frequency is periodically applied.

FIG. 25 is a graph illustrating a response characteristic of the graphene touch sensor when a variable pressure is applied to the graphene touch sensor according to the second embodiment of the inventive concepts.

Referring to FIG. 25, gradually increasing pressure and gradually decreasing pressure were applied to the graphene touch sensor according to the embodiment of the inventive concepts described with reference to FIG. 23, and response characteristics ($\Delta C/C_0$) were measured. It may be recognized that the response characteristic ($\Delta C/C_0$) of the graphene touch sensor gradually increases to correspond to the increasing pressure when the gradually increasing pressure is applied to the graphene touch sensor. It may be recognized that the response characteristic ($\Delta C/C_0$) of the graphene touch sensor gradually decreases to correspond to the decreasing pressure when the gradually decreasing pressure is applied to the graphene touch sensor. In other words, it may be recognized that the intensity of the touch pressure of an object and the pressure change amount of the object can be effectively measured using the graphene touch sensor according to the embodiment of the inventive concepts.

FIG. 26 is a graph illustrating a continuous response characteristic of the graphene touch sensor according to the second embodiment of the inventive concepts.

Referring to FIG. 26, pressure was periodically applied 100 times to the graphene touch sensor according to the embodiment of the inventive concepts described with reference to FIG. 23, and a response characteristic ($\Delta C/C_0$) of the graphene touch sensor was measured. As shown in FIG. 26, the response characteristic of the graphene touch sensor is not deteriorated by the periodical pressure of 100 times, and the graphene touch sensor shows a reliable response characteristic ($\Delta C/C_0$).

A graphene touch sensor according to a third embodiment of the inventive concepts and a method for manufacturing the same will be described hereinafter.

FIGS. 27 to 29 are views illustrating a graphene touch sensor according to a third embodiment of the inventive concepts and a method for manufacturing the same.

Referring to FIG. 27, a base substrate 910 is provided. The base substrate 910 may be a flexible substrate. For example, the base substrate 910 may be PET, PES, PI, PEN, or PDMS. The base substrate 910 may include a first surface and a second surface opposite to the first surface.

A first graphene pattern 920 may be transferred on the first surface of the base substrate 910. Transferring the first graphene pattern 920 may include preparing a metal thin layer having a graphene layer, adhering the metal thin layer having the graphene layer to the first surface of the base substrate 910, and removing the metal thin layer from the graphene layer. For example, the metal thin layer may be a copper (Cu) thin layer. In this case, the copper thin layer may be removed using FeCl$_3$, HCl, and deionized water.

Referring to FIG. 28, electrode layers 930 may be formed on the first surface of the base substrate 910. The electrode layers 930 may be formed at both sides of the first graphene pattern 920. The electrode layers 930 may be spaced apart from the first graphene pattern 920. Thus, the electrode layers 930 may not be electrically connected to the first graphene pattern 920. For example, the electrode layers 930 may include at least one of chromium (Cr), gold (Au), or platinum (Pt), formed by a sputtering process.

Levels of top surfaces of the electrode layers 930 may be higher than a level of a top surface of the first graphene pattern 920. In other words, the top surfaces of the electrode layers 930 may be disposed at a higher height than the top surface of the first graphene pattern 920, based on the first surface of the base substrate 910. Thus, a distance between the first surface of the base substrate 910 and the top surfaces of the electrode layers 930 may be greater than a distance between the first surface of the base substrate 910 and the top surface of the first graphene pattern 920. In some embodiments, thicknesses of the electrode layers 930 may be greater than a thickness of the first graphene pattern 920, and thus the top surfaces of the electrode layers 930 may have the levels higher than that of the top surface of the first graphene pattern 920.

Referring to FIG. 29, a second graphene pattern 940 may be transferred on the first surface of the base substrate 910 after the formation of the electrode layers 930. Transferring the second graphene pattern 940 may include preparing a metal thin layer having a graphene layer, coating a top surface of the graphene layer with a sacrificial layer, removing the metal thin layer from the graphene layer, disposing the sacrificial layer and the graphene layer on the first surface of the base substrate 910 in such a way that the graphene layer adheres to the first surface of the base substrate 910, and removing the sacrificial layer. The metal thin layer may be a copper (Cu) thin layer, and the sacrificial layer may be formed of PMMA. The metal thin layer may be removed using a FeCl$_3$ solution and HCl, and the sacrificial layer may be removed by acetone.

The second graphene pattern 940 may include a center portion CP, a peripheral portion PP, and an edge portion EP. The center portion CP of the second graphene pattern 940 may be in contact with the first graphene pattern 920. As described below, a contact area between the center portion CP of the second graphene pattern 940 and the first graphene pattern 920 may be adjusted according to a touch of an object. The edge portion EP of the second graphene pattern 940 may be disposed on the electrode layers 930 and may be in contact with the electrode layers 930. The electrode layers 930 may be electrically connected to each other by the second graphene pattern 940 having the edge portion EP. The peripheral portion PP of the second graphene pattern 940 may be defined between the edge portion EP and the center portion CP. The peripheral portion PP and the edge portion EP of the second graphene pattern 930 may not be in contact with the first graphene pattern 920.

FIG. 30 is a view illustrating a touch sensing method of the graphene touch sensor according to the third embodiment of the inventive concepts.

Referring to FIG. 30, an object may touch the second surface of the base substrate 910, and the touch of the object may be sensed by the graphene pattern (i.e., the first graphene pattern 920 and the second graphene pattern 940) disposed on the first surface of the base substrate 910.

In detail, as shown in a view (a) of FIG. 30, when the object does not touch the second surface, a contact area X between the first and second graphene patterns 920 and 940 is defined, and an area Y of the second graphene pattern 940 not being in contact with the first graphene pattern 920 is defined.

As shown in a view (b) of FIG. 30, an object may touch the second surface of the base substrate 910 having the first and second graphene patterns 920 and 940. When the object touches the second surface of the base substrate 910, a contact area X+ΔX between the first and second graphene patterns 920 and 940 may be increased as compared with the contact area X shown in the view (a) of FIG. 30. In other words, the contact area X or X+ΔX between the first and second graphene patterns 920 and 940 disposed on the first surface of the base substrate 910 may be changed according to the touch of the object to the second surface of the base substrate 910.

When the object touches the second surface of the base substrate 910 with a relatively low pressure, the contact area X+ΔX between the first and second graphene patterns 920 and 940 may be increased to reduce a resistance between the electrode layers 930. On the other hand, when the object touches the second surface of the base substrate 910 with a relatively high pressure, the resistance between the electrode layers 930 may be increased by deformation of carbon-carbon (C—C) bonds of a portion Y+ΔY of the second graphene pattern 940 not being in contact with the first graphene pattern 920.

In other words, when the object touches the second surface of the base substrate 910 with a pressure lower than a reference pressure, a resistance of the first and second graphene patterns 920 and 940 between the electrode layers 930 may be reduced by the increase in the contact area X+ΔX between the first and second graphene patterns 920 and 940. On the other hand, when the object touches the second surface of the base substrate 910 with a pressure higher than the reference pressure, a resistance of the portion Y+ΔY of the second graphene pattern 940 between the electrode layers 930 may be increased by the deformation of the carbon-carbon (C—C) bonds. Thus, it is possible to provide the graphene touch sensor having high sensitivity in a low pressure section and having a high response speed in a high pressure section, and the method for manufacturing the same. The resistance may decrease in the low pressure section and may increase in the high pressure section.

FIG. 31 is a view illustrating the graphene touch sensor including a sensing pattern according to the third embodiment of the inventive concepts.

Referring to FIG. 31, an upper substrate 950 having a sensing pattern 952 may be provided on the second surface of the base substrate 910 of the graphene touch sensor described with reference to FIGS. 27 to 30.

According to some embodiments of the inventive concepts, preparing the upper substrate 950 having the sensing pattern 952 may include preparing a substrate having a flat top surface, forming a photoresist pattern on the top surface of the substrate, and patterning the substrate using the photoresist pattern. In this case, the sensing pattern 952 and the upper substrate 950 may constitute one body. In this case, a boundary line between the sensing pattern 952 and the upper substrate 950 may be omitted unlike FIG. 31.

Alternatively, in other embodiments, preparing the upper substrate 950 having the sensing pattern 952 may include forming a material layer on a substrate, forming a photoresist pattern on the material layer, and patterning the material layer using the photoresist pattern.

The sensing pattern 952 may include a plurality of lines extending in one direction. The plurality of lines may be spaced apart from each other and may be arranged at equal intervals. Widths of the plurality of lines may be substantially equal to each other. Heights of the plurality of lines may be substantially equal to each other. In some embodiments, the width of the sensing pattern 952 may be substantially equal to a space between the sensing patterns 952 adjacent to each other.

An object may touch the sensing pattern 952 of the graphene touch sensor according to the embodiment of the inventive concepts. When a specific pattern exists on a surface of the object, the resistance of the graphene patterns 920 and 940 may be changed according to the specific pattern of the surface of the object by contact between the surface of the object and the sensing pattern 952. Thus, it is possible to provide the graphene touch sensor capable of sensing a texture of the object by the resistance change of the graphene patterns 920 and 940 according to a surface characteristic of the object, and the method for manufacturing the same.

Unlike the aforementioned embodiment of the inventive concepts, a structure may be disposed between the base substrate and the electrode layers in other embodiments. This will be described with reference to FIG. 32.

FIG. 32 is a view illustrating a graphene touch sensor according to a modified example of the third embodiment of the inventive concepts and a method for manufacturing the same.

Referring to FIG. 32, structures 912 may be disposed between the first surface of the base substrate 910 and the electrode layers 930. The structures 912 may protrude from the first surface of the base substrate 910. A distance between the first surface of the base substrate 910 and top surfaces of the structures 912 may be greater than the distance between the first surface of the base substrate 910 and the top surface of the first graphene pattern 920.

Due to the structures 912, a distance between the first surface of the base substrate 910 and the top surfaces of the electrode layers 930 may be greater than the distance between the first surface of the base substrate 910 and the top surface of the first graphene pattern 920.

In some embodiments, the structures 912 may be formed when molding the base substrate 910. In this case, the structures 912 and the base substrate 910 may be in one body, and boundaries between the base substrate 910 and the structures 912 may be omitted unlike FIG. 32.

Alternatively, in other embodiments, the structures 912 may be formed of the same material as or a different material from the base substrate 910 and may be adhered to the base substrate 910. In this case, the structures 912 may be provided after or before the formation of the first graphene pattern 920.

FIG. 33 is a graph illustrating a measured transmittance of the graphene touch sensor according to the third embodiment of the inventive concepts.

Referring to FIG. 33, the graphene touch sensor according to the embodiment of the inventive concepts was manufactured using PDMS as the base substrate, and a transmittance of the graphene touch sensor was measured. The transmittance of the graphene touch sensor according to the embodiment of the inventive concepts was 91.7% in a wavelength band of about 550 nm. It may be recognized that the graphene touch sensor according to the embodiment of the inventive concepts has a high transparency.

FIG. 34 is a graph illustrating a sensing characteristic of the graphene touch sensor according to the third embodiment of the inventive concepts.

Referring to FIG. 34, a response characteristic ($\Delta R/R_0$) according to a pressure applied to the graphene touch sensor of the aforementioned embodiment was measured. In the graph of FIG. 34, "$R_0$" denotes a resistance when an object does not touch the graphene touch sensor. In the graph of FIG. 34, "$\Delta R$" denotes a resistance change amount when an object touches the graphene touch sensor.

It may be recognized that the resistance decreases as a touch pressure increases when the touch pressure is lower than about 1 KPa used as a reference value. This may be due to the increase in the contact area between the first graphene pattern and the second graphene pattern, as described with reference to FIG. 30. On the other hand, it may be recognized that the resistance increases as the touch pressure increases when the touch pressure is higher than 1 KPa. This may be due to the deformation of the carbon-carbon (C—C) bonds of the second graphene pattern, as described with reference to FIG. 30.

In other words, the resistance of the graphene touch sensor according to the embodiment of the inventive concepts may decrease in a relatively low pressure section and may increase in a relatively high pressure section.

FIG. 35 is a graph illustrating a characteristic change according to a thickness of a base substrate used in the graphene touch sensor according to the third embodiment of the inventive concepts.

Referring to FIG. 35, graphene touch sensors were manufactured to include the base substrates formed of PDMS and having different thicknesses, and a resistance change according to the thickness of PDMS was measured. As shown in FIG. 35, it may be recognized that the resistance change amount according to the increase in the contact area between the first and second graphene patterns increases as the thickness of the base substrate (PDMS) increases. In addition, it may be recognized that the resistance change amount due to the deformation of the carbon-carbon (C—C) bonds of the second graphene pattern decreases as the thickness of the base substrate (PDMS) increases.

In other words, it may be recognized that the thickness of the base substrate (PDMS) may be adjusted to control two factors (i.e., the contact area between the first and second graphene patterns and the deformation of the carbon-carbon bonds of the second graphene pattern) relative to the resistance change of the graphene touch sensor.

FIG. 36 is a graph illustrating a response characteristic of the graphene touch sensor when a constant pressure is periodically applied to the graphene touch sensor according to the third embodiment of the inventive concepts.

Referring to FIG. 36, a pressure higher than a reference pressure was periodically applied to the graphene touch sensor according to the embodiment of the inventive concepts, thereby measuring a capacitance change. In other words, since the pressure applied by an object is relatively high, the capacitance change is measured in a section in which the resistance increases according to the applied pressure. In the graph of FIG. 36, "$C_0$" denotes a capacitance when an object does not touch the graphene touch sensor. In the graph of FIG. 36, "$\Delta C$" denotes a capacitance change amount when an object touches the graphene touch sensor.

It is recognized that a response characteristic ($\Delta C/C_0$) of the graphene touch sensor according to the embodiment of the inventive concepts is substantially constant in the event that a constant pressure is periodically applied. In other words, the reliability of the response characteristic of the graphene touch sensor according to the embodiment of the inventive concepts may be confirmed.

FIG. 37 is a graph illustrating a human pulse measured using the graphene touch sensor according to the third embodiment of the inventive concepts.

Referring to FIG. 37, the graphene touch sensor according to the embodiment of the inventive concepts was attached to a human wrist, and then, the pulse of the wrist was measured. It may be recognized that the response characteristic ($\Delta C/C_0$) of the graphene touch sensor is exactly measured to correspond to expansion and relaxation of the pulse of the wrist.

In other words, the graphene touch sensor according to the embodiment of the inventive concepts may be applied to a wearable device to effectively measure human bio-signal (e.g., the pulse).

FIG. 38 is a graph illustrating a response characteristic according to a touch speed of an object touching the graphene touch sensor, to which a sensing pattern is adhered, according to the third embodiment of the inventive concepts.

Referring to FIG. 38, FIG. 38 shows results measured by touching a PET tip to a graphene touch sensor, to which one line-shaped sensing pattern having a width of 200 μm and a height of 100 μm was adhered, at speeds of 2 mm/s, 1 mm/s, 0.5 mm/s and 0.1 mm/s (e.g., the PET tip scanned the graphene touch sensor in one direction in a state in which the PEP tip was in contact with the graphene touch sensor). And, FIG. 38 shows results measured by touching a PET tip to a graphene touch sensor, to which two line-shaped sensing patterns having widths of 200 μm and heights of 100 μm were adhered, at speeds of 2 mm/s, 1 mm/s, 0.5 mm/s and 0.1 mm/s. The two line shaped sensing patterns were spaced apart from each other by a space of 200 μm.

It is recognized that the response ($\Delta R/R_0$) characteristic of the graphene touch sensor is changed according to the touch speed of the PET tip touching the sensing pattern of the graphene touch sensor. In other words, a touch speed of an object may be sensed using the graphene touch sensor according to the embodiment of the inventive concepts.

FIG. 39 is a graph illustrating frequencies converted from measured results to explain the response characteristic according to the touch speed of the object touching the graphene touch sensor, to which the sensing pattern is adhered, according to the third embodiment of the inventive concepts.

Referring to FIG. 39, a PET tip touched a graphene touch sensor including a line-shaped sensing pattern having 20 protruding portions, which had widths of 200 μm and heights of 100 μm and were spaced apart from each other at intervals of 200 μm, at speeds of 0.4 mm/s, 0.6 mm/s and 0.8 mm/s. The touch results were converted into frequencies.

It may be recognized that amplitude peaks are different from each other when the touch speeds of the PET tip are different from each other. In other words, a touch speed of an object may be sensed using the graphene touch sensor according to the embodiment of the inventive concepts.

FIG. 40 is a graph illustrating characteristics of the graphene touch sensor according to an intensity of pressure applied to the graphene touch sensor, to which the sensing pattern is adhered, according to the third embodiment of the inventive concepts.

Referring to FIG. 40, a PET tip touched the graphene touch sensor, to which the sensing pattern described with reference to FIG. 39 was adhered, while changing pressure. The touch results were converted into frequencies. The pressures of the PET tip touching the graphene touch sensor were greater in the order of (1), (2), (3), and (4) illustrated in FIG. 40. As shown in FIG. 40, in the event that the PET tip touched the graphene touch sensor with pressures different from each other, output amplitude different from each other were measured to correspond to the touch pressures. In other words, it may be recognized that a touch pressure of an object may be sensed using the graphene touch sensor according to the embodiment of the inventive concepts.

The graphene touch sensor according to example embodiments of the inventive concepts may be used to sense various touch (e.g., hardness, roughness, pressure, viscosity, elasticity, temperature, and shape) of an object. In addition, the graphene touch sensor according to example embodiments of the inventive concepts may be used in various electronic devices and medical devices.

The graphene touch sensor according to some embodiments of the inventive concepts includes the first pattern disposed on the first substrate and having the first protruding region and the first concave region, and the second pattern disposed on the second substrate and having the second protruding region and the second concave region. The first and second patterns having the protruding regions and the concave regions may be disposed to face each other, and thus deformation of the graphene layer between the first and second patterns may be increased when an object touches the graphene touch sensor. As a result, the graphene touch sensor with improved sensitivity may be provided.

In addition, the graphene touch sensor according to some embodiments of the inventive concepts may include the first graphene pattern including the first and second segments spaced apart from each other on the first substrate, and the second graphene pattern disposed on the second substrate. The electrical connection between the first and second segments by the second graphene pattern may be adjusted according to whether or not an object touches the graphene touch sensor. Thus, the graphene touch sensor with high sensitivity and high reliability may be provided.

Moreover, the graphene touch sensor according to some embodiments of the inventive concepts may include the first graphene pattern on the base substrate, and the second graphene pattern on the first graphene pattern. The contact area between the first and second graphene patterns may be adjusted according to a touch of an object. Furthermore, the resistance of the graphene pattern including the first and second graphene patterns may be reduced when the object touches the graphene touch sensor with a relatively low pressure. The resistance of the graphene pattern may be increased when the object touches the graphene touch sensor with a relatively high pressure. Thus, the graphene touch sensor having high sensitivity and high reliability may be provided.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A graphene touch sensor comprising:
a first substrate;
a first pattern disposed on the first substrate, the first pattern having a first protruding region and a first concave region;
a second substrate on the first substrate;
a second pattern disposed on the second substrate to face the first pattern, the second pattern having a second protruding region and a second concave region; and
a graphene layer between the first pattern and the second pattern;
wherein the second substrate includes (a) one surface on which the second pattern is disposed, and (b) another surface opposite to the one surface, and
wherein the graphene touch sensor further comprises an upper substrate disposed on the another surface of the second substrate and having a sensing pattern.

2. The graphene touch sensor of claim 1,
wherein the first protruding region and the second concave region are disposed to face each other, and
wherein the first concave region and the second protruding region are disposed to face each other.

3. The graphene touch sensor of claim 1, wherein the sensing pattern includes a plurality of lines spaced apart from each other and extending in one direction, and the plurality of lines have widths equal to each other.

4. The graphene touch sensor of claim 1, wherein each of the first and second patterns includes a plurality of lines extending in one direction.

5. The graphene touch sensor of claim 1,
wherein one of the first and second patterns includes a plurality of dots spaced apart from each other so as to be two-dimensionally arranged, and
wherein the other of the first and second patterns has a mesh shape capable of receiving the plurality of dots.

6. The graphene touch sensor of claim 1,
wherein a width of the first pattern is equal to a space between the second patterns adjacent to each other, and
wherein a width of the second pattern is equal to a space between the first patterns adjacent to each other.

7. The graphene touch sensor of claim 1, wherein the first and second patterns are formed of an insulating material.

8. A graphene touch sensor comprising:
a first substrate;
a first graphene pattern disposed on the first substrate, the first graphene pattern including a first segment and a second segment;
a second substrate on the first substrate; and
a second graphene pattern disposed between the first substrate and the second substrate,
wherein electrical connection between the first and second segments by the second graphene pattern is adjusted according to whether or not an object touches the graphene touch sensor.

9. The graphene touch sensor of claim 8, further comprising: a separation layer disposed between the first and second graphene patterns and having an opening exposing the second graphene pattern.

10. The graphene touch sensor of claim 9, wherein a groove intersecting the opening of the separation layer is defined between the first segment and the second segment.

11. The graphene touch sensor of claim 10, wherein the first segment and the second segment are electrically disconnected from each other by the groove when the object does not touch the graphene touch sensor.

12. The graphene touch sensor of claim 10, wherein, when the object touches the graphene touch sensor, a portion of the first segment adjacent to the groove and a portion of the second segment adjacent to the groove are in contact with the second graphene pattern such that the first segment and the second segment are electrically connected to each other.

13. The graphene touch sensor of claim 10,
wherein the groove extends in a first direction, and
wherein the second graphene pattern has a line shape extending in a second direction intersecting the first direction.

14. The graphene touch sensor of claim 9, further comprising: electrode layers between the first segment and the separation layer and between the second segment and the separation layer.

15. A graphene touch sensor comprising:
- a base substrate having a first surface and a second surface opposite to the first surface;
- a first graphene pattern on the first surface of the base substrate; and
- a second graphene pattern disposed on the first graphene pattern, wherein a contact area between the first and second graphene patterns is adjusted according to a touch of an object to the second surface.

16. The graphene touch sensor of claim 15,
wherein the second graphene pattern includes:
- a center portion; and
- a peripheral portion not being in contact with the first graphene pattern, and
wherein a contact area between the center portion and the first graphene pattern is adjusted according to the touch of the object to the second surface.

17. The graphene touch sensor of claim 16, further comprising: electrode layers disposed at both sides of the first graphene pattern, the electrode layers spaced apart from the first graphene pattern, and the electrode layers connected to the second graphene pattern, wherein the second graphene pattern further includes: an edge portion disposed on the electrode layers.

18. The graphene touch sensor of claim 17, wherein a distance between the first surface of the base substrate and top surfaces of the electrode layers is greater than a distance between the first surface of the base substrate and a top surface of the first graphene pattern.

19. The graphene touch sensor of claim 18, further comprising:
- structures disposed between the base substrate and the electrode layers,
- wherein the structures and the base substrate are in one body, and
- wherein the structures protrude from the first surface of the base substrate on which the first graphene pattern is disposed.

* * * * *